(12) United States Patent
Lee et al.

(10) Patent No.: US 12,483,243 B2
(45) Date of Patent: Nov. 25, 2025

(54) SEMICONDUCTOR MEMORY DEVICE PERFORMING RECURSIVE ZQ CALIBRATION AND CALIBRATION METHOD THEREOF

(71) Applicant: Samsung Electronics Co., Ltd., Suwon-si (KR)

(72) Inventors: Younggyu Lee, Suwon-si (KR); Tongsung Kim, Suwon-si (KR); Seungjun Bae, Suwon-si (KR); Seonkyoo Lee, Suwon-si (KR); Taesung Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 223 days.

(21) Appl. No.: 18/381,611

(22) Filed: Oct. 18, 2023

(65) Prior Publication Data

US 2024/0223187 A1    Jul. 4, 2024

(30) Foreign Application Priority Data

Jan. 2, 2023   (KR) .......................... 10-2023-0000334

(51) Int. Cl.
*H03K 19/00*  (2006.01)
*H03K 19/017*  (2006.01)
*H03K 19/17784*  (2020.01)

(52) U.S. Cl.
CPC ............ *H03K 19/0005* (2013.01); *H03K 19/01721* (2013.01); *H03K 19/17784* (2013.01)

(58) Field of Classification Search
CPC ............... H03K 19/0005; H03K 19/01; H03K 19/017; H03K 19/01721; H03K 19/0175; H03K 19/017545; H03K 19/0185; H03K 19/018557; G11C 7/10; G11C 7/1057; G11C 7/1087

See application file for complete search history.

(56) References Cited

U.S. PATENT DOCUMENTS

| | | | |
|---|---|---|---|
| 6,188,237 B1 * | 2/2001 | Suzuki | H03K 19/0005 326/86 |
| 7,782,078 B2 * | 8/2010 | Koo | H03K 17/6871 327/112 |
| 9,563,213 B2 | 2/2017 | Addepalli et al. | |

(Continued)

FOREIGN PATENT DOCUMENTS

KR    1020100103146 A    9/2010

*Primary Examiner* — Jason M Crawford
(74) *Attorney, Agent, or Firm* — Muir Patent Law, PLLC

(57) ABSTRACT

A semiconductor memory device may include an impedance adjustment pad, a dummy pull-down driver and an external resistor connected in parallel between the impedance adjustment pad and a ground, a recursive code generation circuit configured to recursively generate a pull-up code and a pull-down code corresponding to a target resistance by using the external resistor and the dummy pull-down driver as a reference resistance, in an impedance calibration operation of the semiconductor memory device, a code register configured to store the generated pull-up code and the pull-down code, and a calibration control logic circuit configured to control the recursive code generation circuit during a plurality of steps in the impedance calibration operation while adjusting a resistance value of the dummy pull-down driver.

20 Claims, 14 Drawing Sheets

(56) References Cited

U.S. PATENT DOCUMENTS

| | | | |
|---|---|---|---|
| 9,825,631 B1 | 11/2017 | Cho et al. | |
| 9,870,808 B2* | 1/2018 | Lee | G06F 3/0652 |
| 10,020,808 B2 | 7/2018 | Jang | |
| 11,115,021 B2 | 9/2021 | Kim et al. | |
| 11,283,447 B2 | 3/2022 | Michioka | |
| 2008/0100333 A1* | 5/2008 | Kim | H03K 19/0005 |
| | | | 326/30 |
| 2009/0243748 A1* | 10/2009 | Kinoshita | H03K 19/0005 |
| | | | 333/17.3 |
| 2010/0164540 A1* | 7/2010 | Kwean | G11C 7/1078 |
| | | | 326/30 |
| 2015/0115999 A1* | 4/2015 | Lee | G11C 5/04 |
| | | | 326/30 |
| 2016/0071568 A1* | 3/2016 | Sakai | G11C 7/1057 |
| | | | 365/158 |
| 2017/0162238 A1* | 6/2017 | Lee | G11C 29/021 |
| 2020/0058332 A1* | 2/2020 | Choi | G11C 8/06 |
| 2021/0242870 A1* | 8/2021 | Kim | G11C 29/50008 |
| 2023/0387903 A1* | 11/2023 | Wen | H03F 3/45269 |
| 2024/0127871 A1* | 4/2024 | An | G11C 7/1048 |
| 2024/0223187 A1* | 7/2024 | Lee | H03K 19/17784 |
| 2024/0290378 A1* | 8/2024 | Chung | G11C 11/4093 |

* cited by examiner

SEMICONDUCTOR MEMORY DEVICE PERFORMING RECURSIVE ZQ CALIBRATION AND CALIBRATION METHOD THEREOF

CROSS-REFERENCE TO RELATED APPLICATION(S)

This application claims priority under 35 U.S.C. § 119 to Korean Patent Application No. 10-2023-0000334 filed on Jan. 2, 2023, in the Korean Intellectual Property Office, the disclosure of which is incorporated by reference herein in its entirety.

BACKGROUND

Embodiments of the present disclosure described herein relates to a semiconductor device, and more particularly, to a semiconductor memory device performing recursive impedance calibration and a calibration method thereof.

According to the demand for high performance and high capacity, the degree of integration of semiconductor memory devices is increasing and the operating speed is rapidly increasing. As the operating speed of a semiconductor memory device increases, the swing width of a signal transmitted and received between the semiconductor memory device and a controller decreases, and distortion of the signal due to impedance mismatch is gradually becoming a problem. To solve this signal distortion problem, impedance calibration (hereinafter referred to as ZQ calibration) is applied to adjust a terminal resistance value of a data input/output terminal of a semiconductor memory device using an external resistor.

As the operating speed of a semiconductor memory device increases, an impedance calibration circuit performing an impedance calibration operation is used to accurately provide a termination impedance having a required target impedance value. Conventionally, after finding the ZQ code using an external resistor, binary multiplication was applied to the ZQ code to implement the target resistance value of the DQ driver. However, in this method, the resistance value set due to the nonlinear characteristics of the actual data driver is often inconsistent with the actual target resistance value. Therefore, it is desired that the precise impedance calibration matching the target resistance value is possible in the ZQ calibration operation.

SUMMARY

Embodiments of the present disclosure provides a semiconductor memory device capable of performing impedance (ZQ) calibration that can be adjusted to an accurate target resistance value without a binary operation process, and a calibration method thereof.

According to an embodiment, a semiconductor memory device may include an impedance adjustment pad, a dummy pull-down driver and an external resistor connected in parallel between the impedance adjustment pad and a ground, a recursive code generation circuit configured to recursively generate a pull-up code or a pull-down code corresponding to a target resistance by using the external resistor or the dummy pull-down driver as a reference resistance, in an impedance calibration operation of the semiconductor memory device, a code register configured to store the generated pull-up code and the pull-down code, and a calibration control logic circuit configured to control the recursive code generation circuit during a plurality of steps in the impedance calibration operation while adjusting a resistance value of the dummy pull-down driver.

According to an embodiment, an impedance calibration method of a semiconductor memory device, the impedance calibration method may include, receiving a target resistance and a calibration command, generating a first pull-up code and a first pull-down code by calibrating a pull-up driver and a pull-down driver using an external resistance connected to an impedance adjustment pad as a reference resistance, setting a dummy pull-down driver connected in parallel to the external resistance between the impedance adjustment pad and a ground to the first pull-down code, and generating a second pull-up code and a second pull-down code by calibrating the pull-up driver and the pull-down driver using a parallel resistance value of the external resistance and the dummy pull-down driver as the reference resistance.

According to an embodiment, a semiconductor memory device may include an impedance adjustment pad, an external resistance and an on-chip dummy pull-down driver connected in parallel between the impedance adjustment pad and a ground, an impedance calibration circuit configured to generate a pull-up code and a pull-down code corresponding to a target resistance using the external resistance and the on-chip dummy pull-down driver as a reference resistance, set the on-chip dummy pull-down driver to a pull-down code of a previous step among a plurality of steps until a pull-up code and a pull-down code corresponding to the target resistance is generated, and perform a recursive impedance calibration operation in current step using a parallel resistance value of the external resistance and the on-chip dummy pull-down driver determined in the previous step as a reference resistance.

BRIEF DESCRIPTION OF THE FIGURES

The above and other objects and features of the present disclosure will become apparent by describing in detail embodiments thereof with reference to the accompanying drawings.

DETAILED DESCRIPTION

It is to be understood that both the foregoing general description and the following detailed description are exemplary, and it is to be considered that an additional description of the claimed invention is provided. Reference signs are indicated in detail in preferred embodiments of the present invention, examples of which are indicated in the reference drawings. Wherever possible, the same reference numbers are used in the description and drawings to refer to the same or like parts.

Hereinafter, impedance and resistance will be used interchangeably. However, it will be well understood that resistance and impedance can be interpreted in the same sense.

Figure 1:
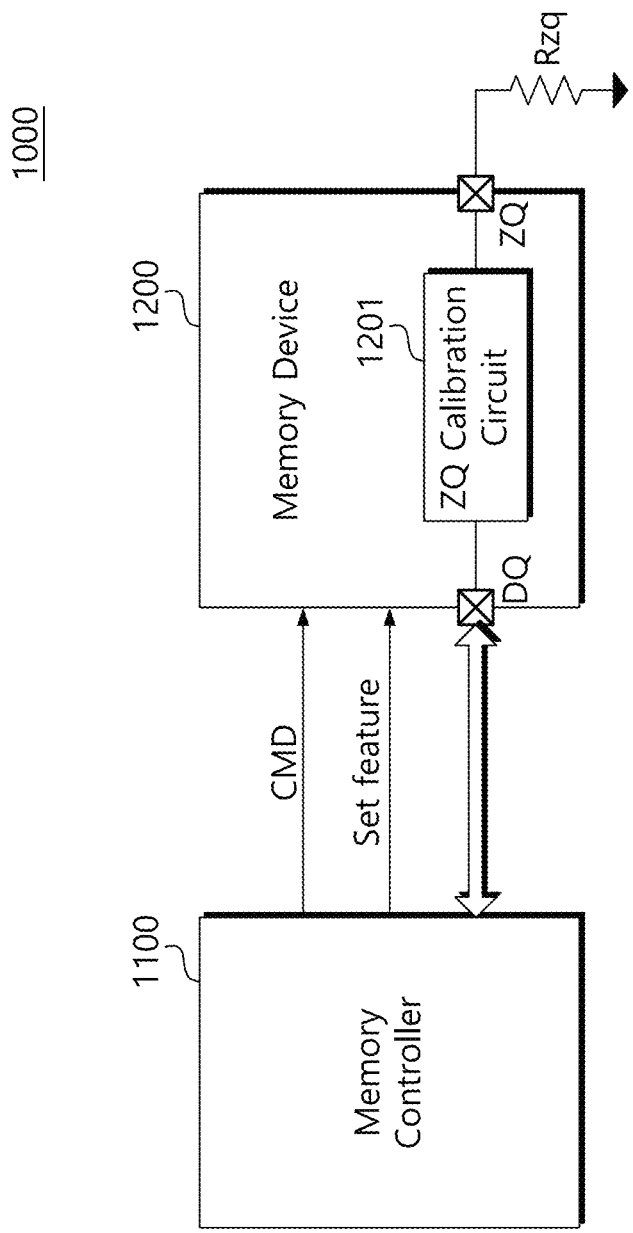
FIG. 1 is a block diagram illustrating a memory system including a memory device according to an exemplary embodiment of the inventive concept.

FIG. 1 is a block diagram illustrating a memory system including a memory device according to an exemplary embodiment of the inventive concept. Referring to FIG. 1, a memory system 1000 according to the present invention may include a memory controller 1100 and a memory device 1200.

The memory controller 1100 may perform an access operation of writing data to the memory device 1200 or reading data stored in the memory device 1200. The memory controller 1100 may generate a command CMD and an address for accessing the memory device 1200. The memory controller 1100 may be at least one of a memory controller for controlling the memory device 1200, a system on chip SoC such as an application processor AP, a central processing unit CPU, and a graphics processing unit GPU.

In particular, the memory controller 1100 may generate a command for calibrating an impedance (hereinafter, ZQ) of the memory device 1200 or a set feature command during a booting or initialization operation. For example, the memory controller 1100 may set a target resistance value for ZQ calibration through a set feature command. The memory controller 1100 may trigger a calibration operation of the memory device 1200 by providing a command CMD for ZQ calibration.

The memory device 1200 outputs read data requested by the memory controller 1100 to the memory controller 1100. Also, the memory device 1200 stores write-requested data from the memory controller 1100 in a memory cell of the memory device 1200. In particular, the memory device 1200 of the present invention may perform a ZQ calibration operation according to the command from the memory controller 1100. To this end, the memory device 1200 may include a ZQ calibration circuit 1201.

The ZQ calibration circuit 1201 performs a ZQ calibration operation in response to the command from the memory controller 1100. In particular, the ZQ calibration circuit 1201 may receive a target resistance value according to the set feature command from the memory controller 1100. Further, a calibration code corresponding to the target resistance value may be generated according to the ZQ calibration command. In this case, the ZQ calibration circuit 1201 may include an internal dummy pull-down driver DPDD to perform a recursive ZQ calibration operation.

In the recursive ZQ calibration operation, the ZQ calibration circuit 1201 uses an external resistor (or, an external resistance) Rzq connected to the outside of the memory device 1200 and a parallel resistance of the on-chip dummy pull-down driver DPDD as reference resistors. The ZQ calibration circuit 1201 may recursively generate a ZQ code corresponding to a target resistance value while adjusting the dummy pull-down driver DPDD. Through the recursive ZQ calibration operation of the present invention, an impedance (or resistance) code of a data driver (DQ Driver) can be generated without binary operation. Using the impedance code generated through the recursive ZQ calibration operation, the ZQ calibration circuit 1201 may set the resistance value of the DQ driver at high resolution.

In here, the memory device 1200 may be a high bandwidth memory (hereinafter referred to as HBM) or a next-generation DRAM (e.g., LPDDR6 or LPDDR7) that operates at ultra-speed. In particular, the memory device 1200 may be a semiconductor memory device in a system-in-package (SiP) in which it is difficult to build an interposer for building a test environment. Alternatively, the memory device 1200 may be a volatile memory device such as Double Data Rate (DDR) SDRAM, Low Power Double Data Rate (LPDDR) SDRAM, Graphics Double Data Rate (GDDR) SDRAM, Rambus Dynamic Random Access Memory (RDRAM), static random access memory (SRAM). Alternatively, the memory device 1200 may be a nonvolatile memory device such as a resistive RAM (RRAM), a phase change memory (PRAM), a magnetoresistive memory (MRAM), a ferroelectric memory (FRAM), a spin injection magnetization reversal memory (STT-RAM), and the like. In this specification, the advantages of the present invention are described based on DRAM, but the technical spirit of the present disclosure is not limited thereto.

As described above, due to the configuration and function of the ZQ calibration circuit 1201 included in the memory device 1200, the memory device 1200 according to the present invention can perform the ZQ calibration operation without a binary operation process. That is, the memory device 1200 of the present invention may perform the recursive ZQ calibration operation using the parallel resistance value of the external resistance Rzq and the dummy pull-down driver DPDD as a reference resistance. Through the recursive ZQ calibration operation, precise impedance calibration matching the target resistance value is possible.

Figure 2:
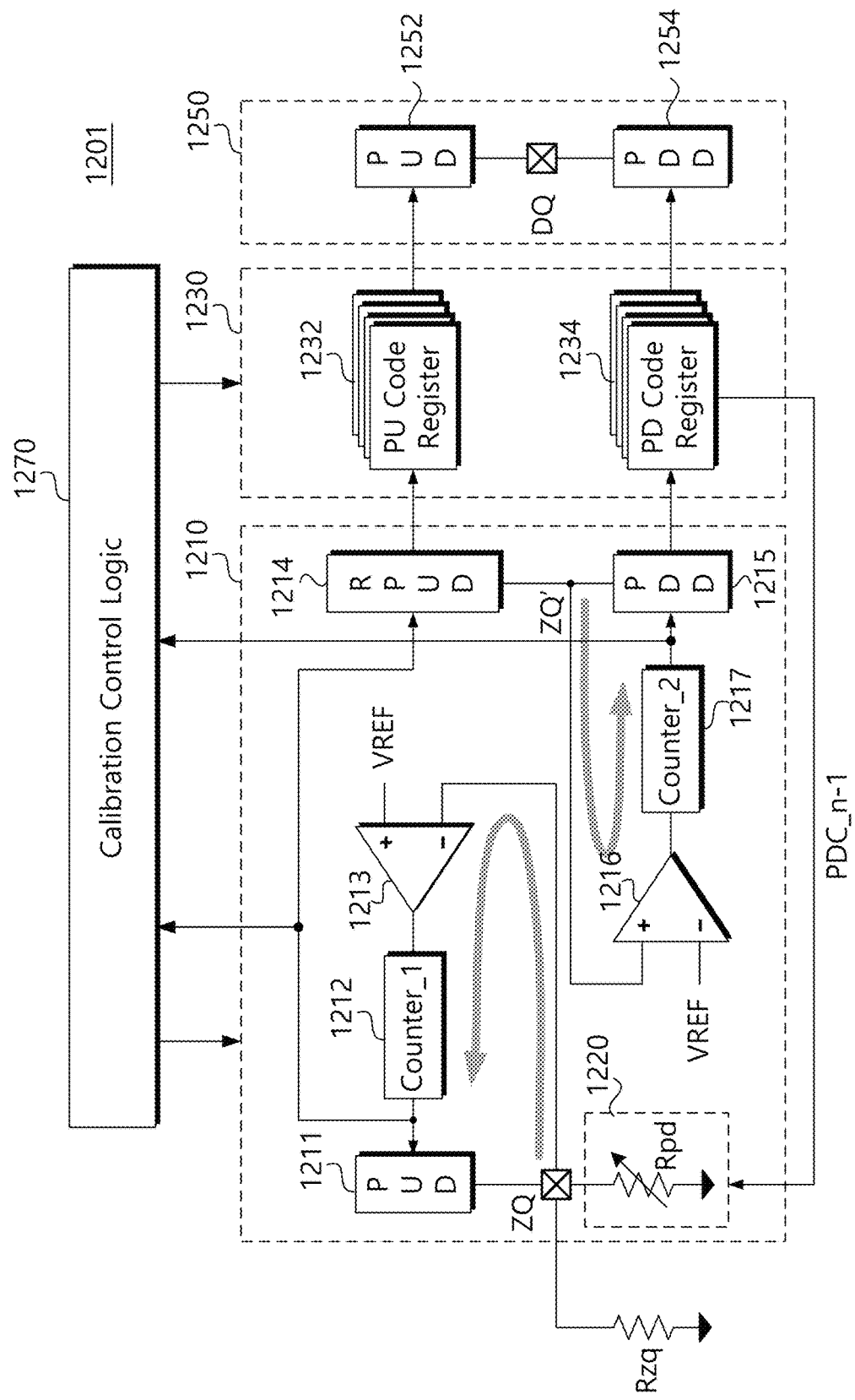
FIG. 2 is a block diagram showing a configuration of a ZQ calibration circuit of FIG. 1 according to example embodiments.

FIG. 2 is a block diagram showing the configuration of the ZQ calibration circuit of FIG. 1 according to example embodiments. Referring to FIG. 2, the ZQ calibration circuit 1201 may include a recursive code generation circuit 1210, a code register 1230, a DQ driver 1250, and a calibration control logic (or, a calibration control logic circuit) 1270.

The recursive code generation circuit 1210 performs a recursive ZQ calibration operation using an external resistor Rzq and a dummy pull-down driver 1220 formed of an on-chip. In the recursive ZQ calibration operation, a pull-up code (PUC) and a pull-down code (PDC) are generated by connecting an external resistor Rzq and the dummy pull-down driver 1220 whose impedance is variable at every step in parallel. For example, a reference resistance for calibration at every step is provided through a parallel connection between the external resistor Rzq and the dummy pull-down driver 1220. Then, in an nth calibration step, a pull-up code and a pull-down code corresponding to the target resistance value 'Rzq/n' may be generated. Accordingly, pull-up and pull-down codes corresponding to target resistance values of various required sizes can be generated without using an operation such as binary multiplication. In addition, pull-up and pull-down codes corresponding to target resistance values with sufficient high resolution required according to the number of steps of the recursive calibration operation may be generated.

The recursive code generating circuit 1210 includes a pull-up driver 1211, a first counter 1212, a first comparator 1213, a replica pull-up driver 1214, a pull-down driver 1215, a second comparator 1216, a second counter 1217, and a dummy pull-down driver 1220.

The pull-up driver 1211, the first counter 1212, and the first comparator 1213 generate a pull-up code PUC corresponding to an external resistor Rzq and a resistance value of the dummy pull-down driver 1220. In a first step of the recursive calibration operation, the pull-up driver 1211, the first counter 1212, and the first comparator 1213 generate pull-up code PUC using only the external resistor Rzq as a reference resistor (or, a reference resistance). For example, in the first step of the recursive calibration operation, the dummy pull-down driver 1220 is turned off. Then, pull-up calibration is performed to set the resistance value of the pull-up driver 1211 so that a reference voltage VREF is distributed to the external resistor Rzq.

For example, pull-up calibration is performed in the following manner. First, the pull-up driver 1211 is initialized. Then, the pull-up driver 1211 may be set to an initial resistance value. It is assumed that the pull-up voltage of the pull-up driver 1211 is the power supply voltage VDDQ. Then, the power voltage VDDQ is divided by the pull-up driver 1211 and the external resistor Rzq acting as a reference resistor. At this time, the voltage Vzq distributed to an impedance adjustment pad (hereinafter, ZQ pad) is input to a negative input terminal (−) of the first comparator 1213. The reference voltage VREF input to a positive input terminal (+) of the first comparator 1213 may be, for example, 'VDDQ/2'.

Assume that the magnitude of the external resistance Rzq is '300Ω'. In the first step ($1^{st}$ Step), the dummy pull-down driver 1220 is deactivated or opened. In this case, the dummy pull-down driver 1220 is deactivated by a pull-down code, for example, '000000.' Therefore, the first counter 1212 counts up or counts down the code of the pull-up driver 1211 until the ZQ pad voltage Vzq across the external resistor Rzq reaches the reference voltage (VREF=VDDQ/2). As a result, the resistance value of the pull-up driver 1211 in a state where the ZQ pad voltage Vzq reaches the reference voltage (VREF=VDDQ/2) will be about '300Ω'. The pull-up code PUC at this time may be determined as a code value for setting the pull-up driver 1211 to '300Ω'. At this time, the count value determined by the first counter 1212 is transmitted to the replica pull-up driver 1214, the calibration control logic 1270, and the pull-up code register 1232 as a first pull-up code PUC_1 generated in the first step.

Subsequently, pull-down calibration is performed to generate a first pull-down code PDC_1 corresponding to the first pull-up code PUC_1. The same resistance value as that of the pull-up driver 1211 may be provided by the replica pull-up driver 1214 set to the first pull-up code PUC_1. Pull-down calibration may be performed to set the pull-down driver 1215 to have resistance value of '300Ω' using the replica pull-up driver 1214 having a resistance value of '300Ω'.

The second counter 1217 count-up or count-down the code value of the pull-down driver 1215 until the voltage at the node (ZQ') between the replica pull-up driver 1214 and the pull-down driver 1215 reaches the reference voltage (VREF=VDDQ/2). When the node (ZQ') voltage reaches the reference voltage (VREF=VDDQ/2), the resistance of the pull-down driver 1215 will be '300Ω'. The code value at this time may be determined as a pull-down code value for setting the pull-down driver 1215 to '300Ω'. The count value determined by the second counter 1217 is transmitted to the calibration control logic 1270 and the pull-down code register 1234 as the first pull-down code PDC_1 determined in the first step.

Following the first step, a second step of the recursive calibration operation proceeds. Also in the second step, the calibration of the pull-up driver 1211 and the calibration of the pull-down driver 1215 are sequentially performed. First, for calibration of the pull-up driver 1211, the dummy pull-down driver 1220 is set to the pull-down code PDC_1 generated as a result of the previous step. For example, the calibration control logic 1270 inputs the pull-down code PDC_1 generated in the first step from the pull-down code register 1234 to the dummy pull-down driver 1220. Then, the dummy pull-down driver 1220 is set to the resistance value '300Ω' of the pull-down driver 1215 set in the first step.

Next, the pull-up driver 1211 is initialized. The pull-up driver 1211 is calibrated using the parallel resistance value of the external resistor Rzq and the set dummy resistance value Rpd of the dummy pull-down driver 1220 as a reference resistor. The dummy resistance value Rpd provided by the pull-down code PDC_1 generated in the first step is substantially equal to the external resistance Rzq. Therefore, the parallel resistance value of the external resistance Rzq and the dummy resistance value Rpd in the second step is 'Rzq/2' corresponding to half of the external resistance Rzq. For example, when the external resistance Rzq is '300Ω', the reference resistance in the second step is set to 'Rzq/2=150Ω'.

When the calibration of the pull-up driver 1211 in the second step starts, voltage division occurs by the pull-up driver 1211 and the reference resistor Rzq/2, and the voltage Vzq distributed to the ZQ pad is 1213) is entered. The reference voltage VREF supplied to the positive input terminal (+) of the first comparator 1213 is 'VDDQ/2'. Until the ZQ pad voltage (Vzq) across the reference resistor (Rzq/2) reaches the reference voltage (VREF=VDDQ/2), the first comparator 1213 and the first counter 1212 counts up or counts down the code on the pull-up driver 1211. When the ZQ pad voltage (Vzq) reaches the reference voltage (VREF=VDDQ/2), the resistance of the pull-up driver 1211 will indicate 'Rzq/2, e.g., 150Ω', which is the same as the reference resistance. At this time, the pull-up code PUC of the pull-up driver 1211 is determined as a code value for setting the resistance of the pull-up driver 1211 to 'Rzq/2'. The determined code value is transferred to the replica pull-up driver 1214, the calibration control logic 1270, and the pull-up code register 1232 as a second pull-up code PUC_2.

Subsequently, the pull-down driver 1215 is calibrated to generate a second pull-down code PDC_2 corresponding to the second pull-up code PUC_2. When set to the second pull-up code PUC_2, the replica pull-up driver 1214 is set to 'Rzq/2', which is the same resistance (or impedance) as the pull-up driver 1211. For example, the pull-down driver 1215 is calibrated to have a resistance value of '150Ω' using the replica pull-up driver 1214 having a resistance value of '150Q'. The second counter 1217 counts up or counts down the code value of the pull-down driver 1215 until the voltage at the node (ZQ') between the replica pull-up driver 1214 and the pull-down driver 1215 reaches the reference voltage (VREF=VDDQ/2). When the voltage of the node ZQ' reaches the reference voltage (VREF=VDDQ/2), the resistance value of the pull-down driver 1215 will be 'Rzq/2', for example, '150Ω'. The count value fixed by the second counter 1217 is transferred to the calibration control logic 1270 and the pull-down code register 1234 as the second pull-down code PDC_2 determined in the second step.

Following the second step, a third step of the recursive calibration operation proceeds. Also in the third step, the calibration of the pull-up driver 1211 and the calibration of the pull-down driver 1215 are sequentially performed. In the third step of the recursive calibration operation, the dummy pull-down driver 1220 is set to the pull-down code PDC_2 generated as a result of the second step. Then, the dummy resistance value Rpd set in the dummy pull-down driver 1220 becomes 'Rzq/2'. In addition, the parallel resistance value of the external resistance Rzq and the dummy resistance value Rpd will be 'Rzq/3'. When the external resistance (Rzq) is 300Ω, the reference resistance in the third step will be set to 'Rzq/3=100Ω'.

Consequently, in the third step, the first comparator 1213 and the first counter 1212 are calibrated so that the pull-up driver 1211 has a resistance value of 'Rzq/3'. Further, the second comparator 1216 and the second counter 1217 are calibrated so that the pull-down driver 1215 has a resistance value of 'Rzq/3'. The third pull-up code PUC_3 and the third pull-down code PDC_3 generated as a result of the third step of the recursive calibration operation are stored in the pull-up code register 1232 and the pull-down code register 1234, respectively.

The recursive calibration operation will be repeated until a pull-up code PUC_n and a pull-down code PDC_n corresponding to the target resistance are generated. Each resistance value of the pull-up driver 1211 and the pull-down driver 1215 corresponds to 'Rzq/n' by the pull-up code PUC_n and the pull-down code PDC_n generated in the nth step of the recursive calibration operation. For example, if calibration is to be performed with a target resistance value of '25Ω' using an external resistor of '300Ω', the recursive calibration operation of the present invention requires 12 steps of calibration.

The code register 1230 stores pull-up codes and pull-down codes generated at every step of the recursive calibration operation. The pull-up code register 1232 stores the pull-up code PUC_n of the pull-up driver 1211 determined by the first comparator 1213 and the first counter 1212 at the nth step. The pull-down code PDC_n of the pull-down driver 1215 determined by the second comparator 1216 and the second counter 1217 at the nth step is stored in the pull-down code register 1234. The pull-down code PDC_n at the current step stored in the pull-down code register 1234 is also provided as a code value for setting the dummy pull-down driver 1220 at the next step (n+1).

The DQ driver 1250 may include a pull-up driver 1252 and a pull-down driver 1254. The pull-up driver 1252 forms a pull-up resistor of the DQ driver 1250 according to a target pull-up code provided from the pull-up code register 1232. The pull-up driver 1252 may be formed substantially the same as the pull-up driver 1211 of the recursive code generation circuit 1210. The pull-down driver 1254 forms a pull-down resistor of the DQ driver 1250 according to a target pull-down code (Target PD code) provided from the pull-down code register 1234. The pull-down driver 1254 may be formed substantially the same as the pull-down driver 1215 of the recursive code generation circuit 1210.

The calibration control logic 1270 monitors and controls the recursive ZQ calibration operation of the ZQ calibration circuit 1201. The pull-up code PUC_i and the pull-down code PDC_i determined by the first counter 1212 and the second counter 1217 are output at every step. Then, the calibration control logic 1270 stores the determined pull-up code PUC_i and pull-down code PDC_i in the pull-up code register 1232 and the pull-down code register 1234 in response thereto. At the start of each step, the calibration control logic 1270 reads the pull-down code of the previous step stored in the pull-down code register 1234 and sets the dummy pull-down driver 1220. The calibration control logic 1270 initializes the pull-up driver 1211 during pull-up calibration. Further, the calibration control logic 1270 sets the replica pull-up driver 1214 and initializes the pull-down driver 1215 during pull-down calibration.

When the recursive ZQ calibration operation is completed, the calibration control logic 1270 sets the pull-up driver 1252 of the DQ driver 1250 to the target pull-up code (Target PU code) stored in the pull-up code register 1232. In addition, the calibration control logic 1270 sets the pull-down driver 1254 of the DQ driver 1250 to the target pull-down code (Target PD code) stored in the pull-down code register 1234.

In the above, the recursive ZQ calibration operation performed by the ZQ calibration circuit 1201 of the present invention has been briefly described. In each step of the recursive ZQ calibration operation, calibration is performed using the external resistance Rzq and the parallel resistance value of the dummy pull-down driver 1220 as reference resistance. Accordingly, as the steps of the recursive calibration operation are repeated, the pull-up code PUC and the pull-down code PDC matching the target resistance value may be generated. In addition, calibration may be completed by providing the generated pull-up code (PUC) and pull-down code (PDC) to the DQ driver 1250 without a separate code generator or binary operation. Accordingly, the ZQ calibration circuit 1201 of the present invention can provide a high-resolution target resistance value to the DQ driver 1250.

Figure 3:
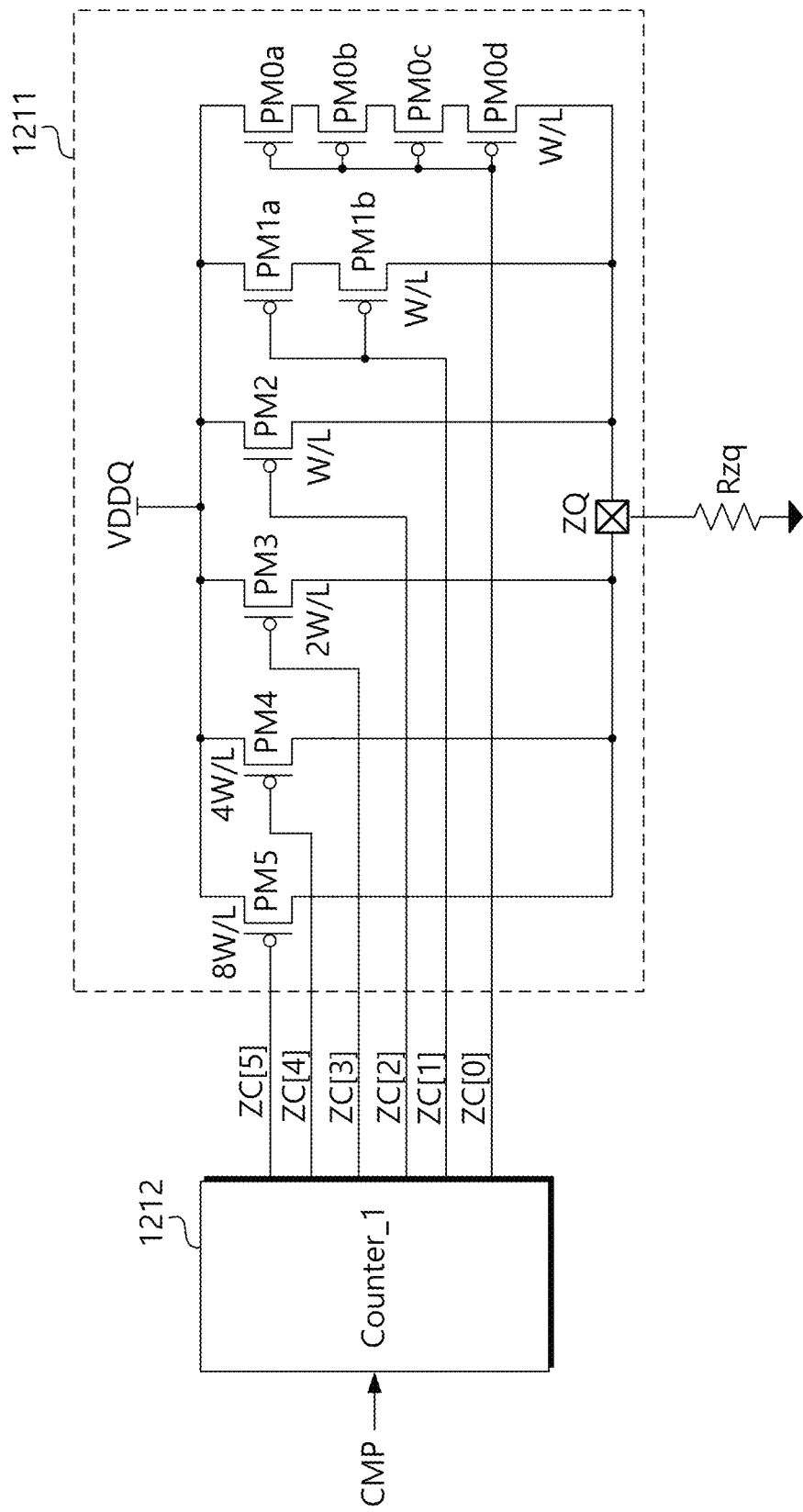
FIG. 3 is a circuit diagram exemplarily showing a structure of a pull-up driver of FIG. 2 according to example embodiments.

FIG. 3 is a circuit diagram showing the structure of the pull-up driver of FIG. 2 according to example embodiments. Referring to FIG. 3, the structure of the pull-up driver 1211 may be the same as the replica pull-up driver 1214 and the pull-up driver 1252 of the DQ driver 1250 shown in FIG. 2.

The pull-up driver 1211 may include a plurality of PMOS transistors PM0 to PM5 switched by the calibration code ZC[5:0] provided from the first counter 1212. Each of the plurality of PMOS transistors PM0 to PM5 is composed of devices having different aspect ratios (width/length W/L). For example, PMOS transistors (PM0a, PM0b, PM0c, PM0d) of aspect ratio (W/L) are connected in series between the power supply voltage terminal (VDDQ) and the ZQ pad, and are turned on or turned off by the calibration code ZC[0]. PMOS transistors PM1a and PM1b of aspect ratio (W/L) are connected in series between the power supply voltage terminal VDDQ and the ZQ pad, and are turned on or off by the calibration code ZC[1]. The PMOS transistor PM2 of aspect ratio (W/L) is connected between the power supply voltage terminal VDDQ and the ZQ pad, and is turned on or off by the calibration code ZC[2]. The PMOS transistor PM3 of aspect ratio (2W/L) is connected between the power supply voltage terminal VDDQ and the ZQ pad, and is turned on or off by the calibration code ZC[3]. The PMOS transistor PM4 of aspect ratio (4W/L) is connected between the power supply voltage terminal VDDQ and the ZQ pad, and is turned on or off by the calibration code ZC[4]. The PMOS transistor PM5 of aspect ratio (8W/L) is connected between the power supply voltage terminal VDDQ and the ZQ pad, and is turned on or off by the calibration code ZC[5]. The different aspect ratios mean that the magnitude of the current flowing under the same voltage condition (VDDQ) is different. The pull-up driver 1211 of this structure eventually acts as a pull-up resistor whose resistance is increased or decreased in a binary form by the calibration code ZC[5:0].

According to the above conditions, the resistances of the PMOS transistors PM0 to PM5 may be counted up or counted down by the calibration code ZC[5:0]. For example, while the comparison signal CMP provided from the first comparator 1213 maintains a high level, the first counter 1212 counts up the calibration code ZC[5:0] to increase the voltage of the node ZQ. In a loop where the voltage distributed to the external resistor Rzq connected to the ZQ pad reaches VDDQ/2, the comparison signal CMP transitions to a low level. Then, the calibration code ZC[5:0] at this time is determined as the pull-up code and stored in the replica pull-up driver 1214 and the pull-up code register 1232. A resistance (or impedance) value may be provided through the pull-up driver 1211 implemented in such a binary type.

Figure 4:
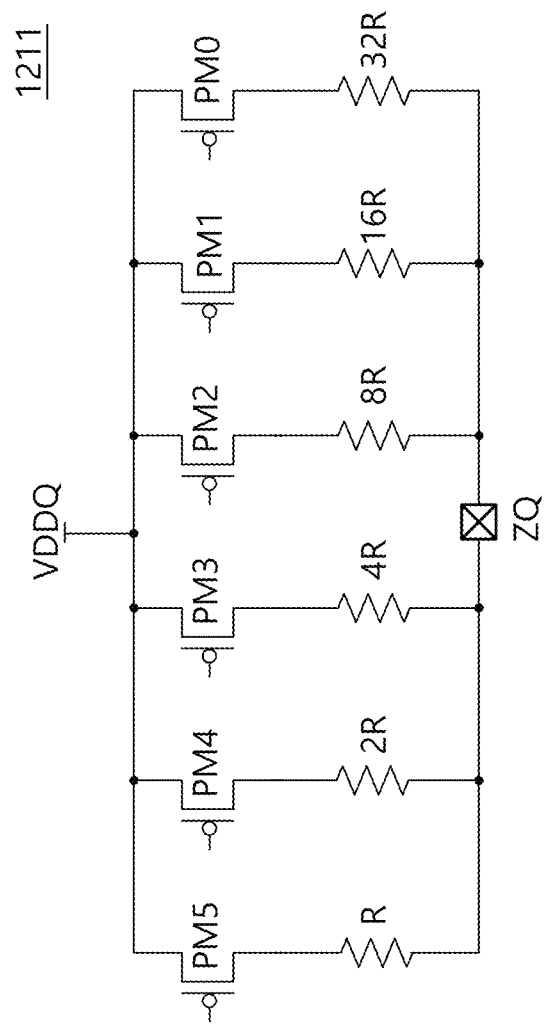
FIG. 4 is a diagram briefly showing an equivalent circuit of the pull-up driver of FIG. 3 according to example embodiments.

FIG. 4 is a diagram briefly showing an equivalent circuit of the pull-up driver of FIG. 3 according to example embodiments. Referring to FIG. 4, the binary type of pull-up driver 1211 may be equivalent to a plurality of switch-resistor sets connected in parallel between a power voltage terminal VDDQ and a ZQ pad.

A resistor 32R connected in series with the PMOS transistor PM0 between the power supply voltage terminal VDDQ and the ZQ pad constitutes a first switch-resistor set. A resistor 16R connected in series with the PMOS transistor PM1 between the power supply voltage terminal VDDQ and the ZQ pad constitutes a second switch-resistor set. A resistor 8R connected in series with the PMOS transistor PM2 between the power supply voltage terminal VDDQ and the ZQ pad constitutes a third switch-resistor set. A resistor 4R connected in series with the PMOS transistor PM4 between the power supply voltage terminal VDDQ and the ZQ pad constitutes a fourth switch-resistor set. A resistor 2R connected in series with the PMOS transistor PM4 between the power supply voltage terminal VDDQ and the ZQ pad constitutes a fifth switch-resistor set. A resistor R connected in series with the PMOS transistor PM5 between the power supply voltage terminal VDDQ and the ZQ pad constitutes a sixth switch-resistor set.

The pull-up driver 1211 of the above structure eventually acts as a pull-up resistor whose resistance is increased or decreased in a binary form by the calibration code ZC[5:0]. It will be well understood that the replica pull-up driver 1214 or the pull-up driver 1252 of the DQ driver 1250 may have the same structure as the binary-type pull-up driver 1211.

Figure 5:
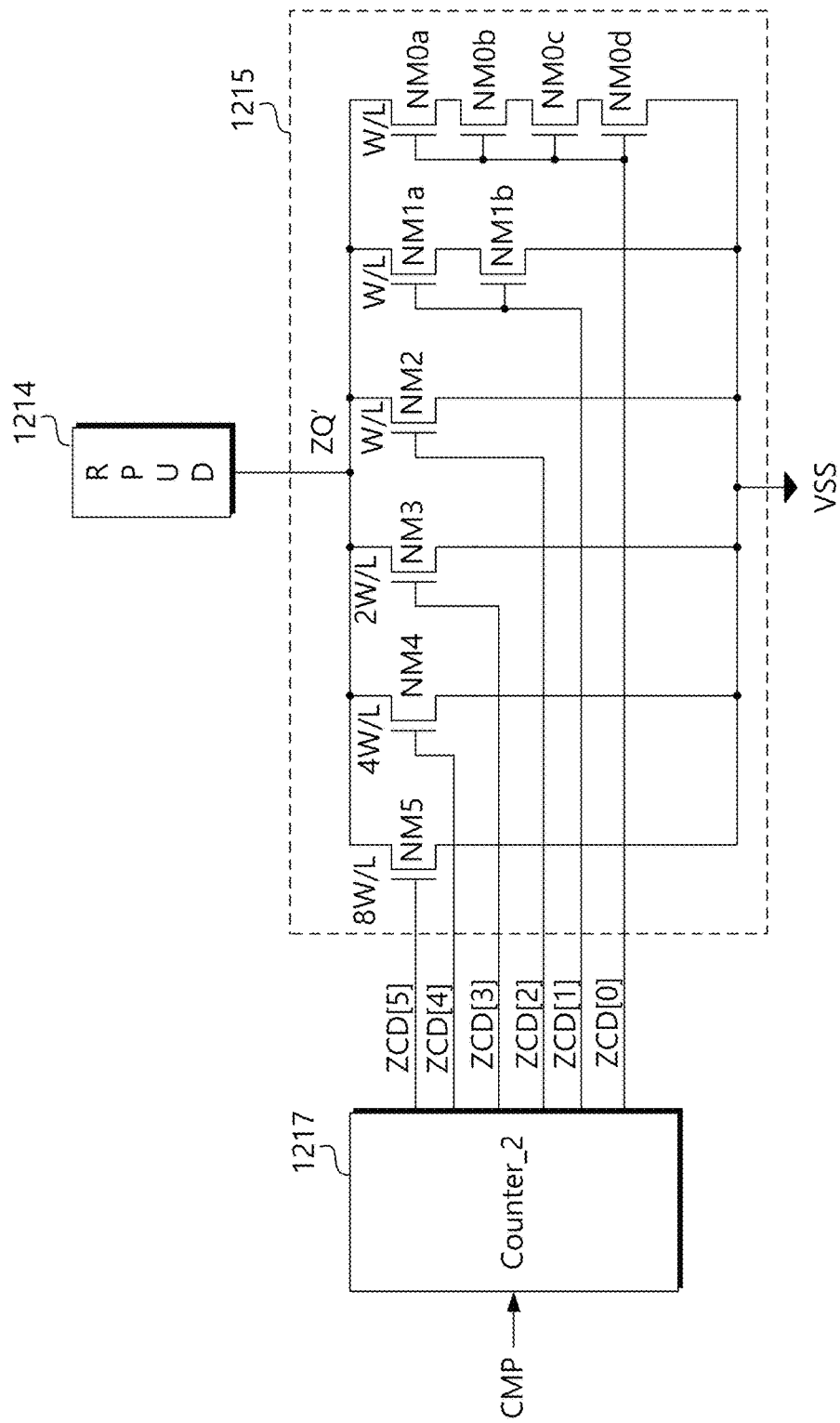
FIG. 5 is a circuit diagram showing a structure of a pull-down driver of FIG. 2 according to example embodiments.

FIG. 5 is a circuit diagram showing the structure of the pull-down driver of FIG. 2 according to example embodiments. Referring to FIG. 5, the structure of the pull-down driver 1215 may be the same as the dummy pull-down driver 1220 and the pull-down driver 1254 of the DQ driver 1250 shown in FIG. 2.

The pull-down driver 1215 may include a plurality of NMOS transistors NM0 to NM5 switched by the calibration code ZCD[5:0] provided from the second counter 1217. Each of the plurality of NMOS transistors NM0 to NM5 is composed of devices having different aspect ratios (W/L). For example, NMOS transistors (NM0a, NM0b, NM0c, and NM0d) of aspect ratio (W/L) are connected in series between the replica pull-up driver 1214 and a ground (or VSS), and are turned on or turned off by the calibration code ZCD[0]. NMOS transistors NM1a and NM1b of aspect ratio (W/L) are connected in series between the replica pull-up driver 1214 and the ground (or VSS), and are turned on or off by the calibration code ZCD[1]. The NMOS transistor NM2 of aspect ratio (W/L) is connected between the replica pull-up driver 1214 and the ground (or VSS), and is turned on or off by the calibration code ZCD[2]. The NMOS transistor NM3 of aspect ratio (2W/L) is connected between the replica pull-up driver 1214 and the ground (or VSS), and is turned on or off by the calibration code ZCD[3]. The NMOS transistor NM4 of aspect ratio (4W/L) is connected between the replica pull-up driver 1214 and the ground (or VSS), and is turned on or off by the calibration code ZCD[4]. The NMOS transistor NM5 of aspect ratio (8W/L) is connected between the replica pull-up driver 1214 and the ground (or VSS), and is turned on or off by the calibration code ZCD[5]. Due to different aspect ratios, each of the plurality of NMOS transistors NM0 to NM5 switches currents of different magnitudes under the same voltage condition (VDDQ/2). The pull-down driver 1215 of this structure can eventually operate as a pull-down resistor whose magnitude is increased or decreased in a binary form by the calibration code ZCD[5:0].

According to the above conditions, the resistances of the NMOS transistors NM0 to NM5 may be counted up or counted down by the calibration code ZCD[5:0]. For example, while the comparison signal CMP provided from the second comparator 1217 maintains a high level, the second counter 1217 counts up the calibration code ZCD[5:0] to decrease the voltage of the node ZQ'. When the voltage distributed to the node ZQ' reaches VDDQ/2, the comparison signal CMP transitions to a low level. Then, the calibration code ZCD[5:0] at this time is determined as a pull-down code and stored in the pull-up code register 1232. Then, the pull-down code stored in the pull-up code register 1232 is used to set the dummy pull-down driver 1220 in the next step.

Figure 6:
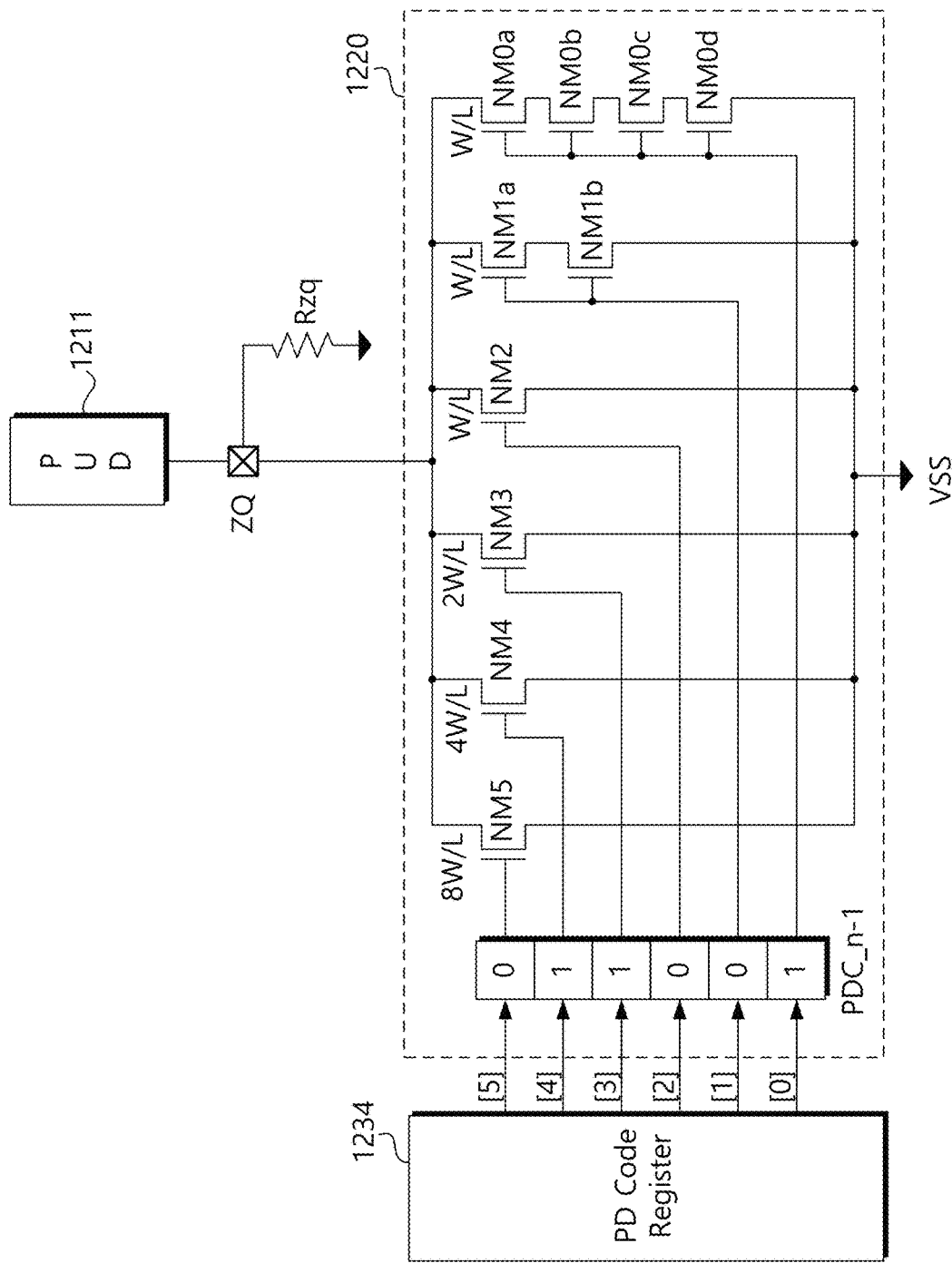
FIG. 6 is a circuit diagram showing a configuration of a dummy pull-down driver according to example embodiments.

FIG. 6 is a circuit diagram exemplarily showing the configuration of a dummy pull-down driver according to example embodiments. Referring to FIG. 6, a dummy pull-down driver 1220 formed on-chip in the memory device 1200 is connected in parallel with an external resistor Rzq between a ZQ pad and a ground (or VSS). In addition, the dummy pull-down driver 1220 is set to a pull-down code (PDC_i, where 'i' is the number of steps) that is updated as the steps of the recursive ZQ calibration operation increase. For example, in order to proceed with the nth step of the current recursive calibration operation, the dummy pull-down driver 1220 must be set to a resistance value of 'Rzq/(n−1)' by the pull-down code PDC_n−1. Hereinafter, it will be assumed that the step of the currently ongoing recursive calibration operation is the nth step.

The dummy pull-down driver 1220 may include a plurality of NMOS transistors NM0 to NM5. Each of the plurality of NMOS transistors NM0 to NM5 is composed of devices having different aspect ratios (W/L). Each of the NMOS transistors (NM0a, NM0b, NM0c, and NM0d) of aspect ratio (W/L) is connected in series between the ZQ pad and a ground (or VSS), and is turned on or turned off by the pull-down code PDC_n−1[0]. The NMOS transistors NM1a and NM1b of aspect ratio (W/L) are connected in series between the ZQ pad and the ground (or VSS), and are turned on or off by a pull-down code PDC_n−1[1]. The NMOS transistor NM2 of aspect ratio (W/L) is connected between the ZQ pad and the ground (or VSS), and is turned on or off by the pull-down code PDC_n−1[2]. The NMOS transistor NM3 of aspect ratio (2W/L) is connected between the ZQ pad and the ground (or VSS), and is turned on or off by the pull-down code PDC_n−1[3]. The NMOS transistor NM4 of aspect ratio (4W/L) is connected between the ZQ pad and the ground (or VSS), and is turned on or off by the pull-down code PDC_n−1[4]. The NMOS transistor NM5 of aspect ratio (8W/L) is connected between the ZQ pad and the ground (or VSS), and is turned on or off by the pull-down code PDC_n−1[5]. Due to different aspect ratios, each of the plurality of NMOS transistors NM0 to NM5 switches currents of different magnitudes under the same voltage condition (VDDQ/2). The dummy pull-down driver 1220 having this structure can eventually operate as a pull-down resistor whose magnitude is increased or decreased in a binary form by the pull-down code PDC_n−1[5:0].

The dummy pulldown driver 1220 is set to the pull-down code (PDC_n−1[5:0]) determined in the previous step (n−1) provided from the pull-down code register 1234. For example, it is assumed that the pull-down code PDC_n−1 provided from the pull-down code register 1234 is '011001'. Then, the NMOS transistors NM0*a*, NM0*b*, NM0*c*, NM0*d*, NM3, and NM4 are turned on, and the NMOS transistors NM1*a*, NM1*b*, NM2, and NM5 are turned off. Under these condition, the dummy pull-down driver 1220 may be set to a resistance value corresponding to the aspect ratio (W/L) of each transistor. In this case, the resistance value of the dummy pull-down driver 1220 may be set to the same value as the resistance value 'Rzq/(n−1)' of the pull-down driver 1215 in the previous step.

As a result, in the present nth step, the dummy pull-down driver 1220 is set to the resistance value 'Rzq/(n−1)'. Then, the reference resistance value formed between the ZQ pad and the ground is set to 'Rzq/n' corresponding to the parallel resistance of the external resistance Rzq and the dummy pull-down driver 1220 of the resistance value 'Rzq/(n−1)'. In the pull-up calibration of the nth step, the pull-up driver 1211 is calibrated based on the reference resistance value 'Rzq/n'.

Figure 7:
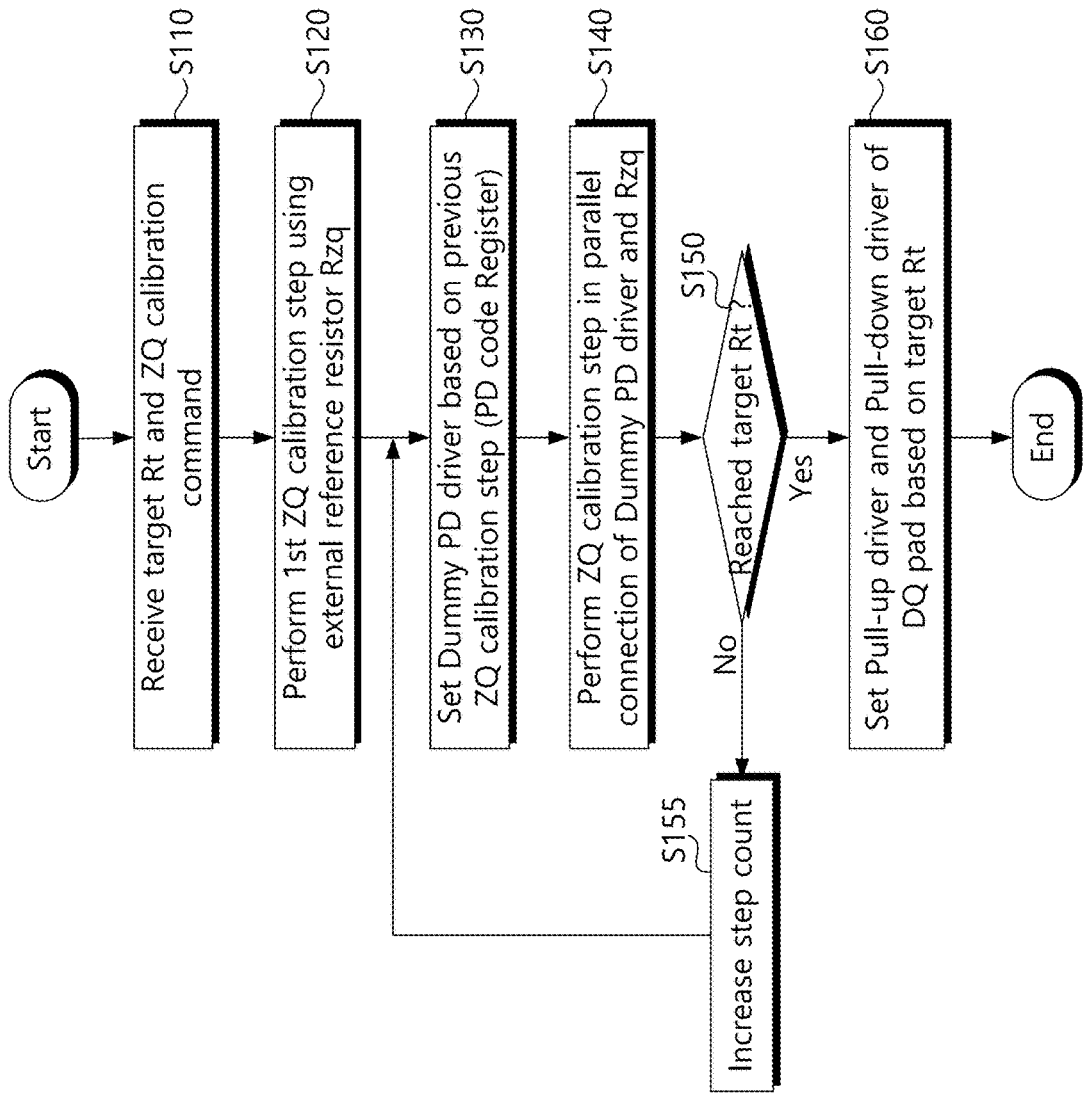
FIG. 7 is a flowchart illustrating a recursive ZQ calibration operation in a memory device according to an embodiment of the present invention.

FIG. 7 is a flowchart illustrating a recursive ZQ calibration operation in a memory device according to an embodiment of the present invention. Referring to FIG. 7, pull-up and pull-down resistances of the DQ driver 1250 may be set with a high-resolution target resistance value (Rt) through the recursive ZQ calibration operation of the present invention.

In step S110, the memory device 1200 may receive the target resistance value Rt from the memory controller 1100 through a set feature command. Also, the memory device 1200 may receive a command for a recursive ZQ calibration operation from the memory controller 1100. Such a command for the recursive ZQ calibration operation may be included in a booting or initialization procedure of the memory device 1200.

In step S120, the memory device 1200 proceeds with a first step for recursive ZQ calibration operation. In the first step of the recursive calibration operation, the pull-up code PUC of the pull-up driver 1211 is generated using only the external resistance Rzq as a reference resistance. For example, when the pull-up driver 1211 is initialized, the first counter 1212 counts up or counts down the pull-up driver 1211 until the ZQ pad voltage (Vzq) distributed to the external resistor (Rzq) reaches the reference voltage (VREF=VDDQ/2). The resistance value of the pull-up driver 1211 in a state where the ZQ pad voltage Vzq reaches the reference voltage (VREF=VDDQ/2) will be the same as the external resistance Rzq. The count value determined by the first counter 1212 is transmitted to the replica pull-up driver 1214, the calibration control logic 1270, and the pull-up code register 1232 as the first pull-up code PUC_1 generated in the first step.

Subsequently, pull-down calibration is performed to generate a first pull-down code PDC_1 corresponding to the first pull-up code PUC_1. The replica pull-up driver 1214 set to the first pull-up code PUC_1 provides the same resistance value Rzq as the pull-up driver 1211. The second counter 1217 outputs the code value of the pull-down driver 1215 until the voltage at the node (ZQ') between the replica pull-up driver 1214 and the pull-down driver 1215 reaches the reference voltage (VREF=VDDQ/2). By the pull-down calibration, the resistance value of the pull-down driver 1215 is set to the same value as 'Rzq'. The count value determined by the second counter 1217 is transmitted to the calibration control logic 1270 and the pull-down code register 1234 as the first pull-down code PDC_1 determined in the first step.

In step S130, the setting of the dummy pull-down driver 1220 for the recursive ZQ calibration operation of the second step or more steps is performed. For calibration of the pull-up driver 1211, the dummy pull-down driver 1220 is set to the pull-down code (PDC_1) generated as a result of the previous step (i.e., the first step). For example, the calibration control logic 1270 inputs the pull-down code PDC_1 generated in the first step from the pull-down code register 1234 to the dummy pull-down driver 1220. Then, the dummy pull-down driver 1220 is set to the resistance value 'Rzq' of the pull-down driver 1215 set in the first step.

In step S140, a second step or more of a recursive ZQ calibration operation using the parallel resistance value of the external resistor Rzq and the dummy pull-down driver 1220 as a reference resistance is performed. First, the pull-up driver 1211 is initialized. In the second step, the parallel resistance value of the external resistance Rzq and the dummy resistance value Rpd becomes 'Rzq/2' corresponding to half of the external resistance Rzq. For example, when the external resistance (Rzq) is 300Ω, the reference resistance in the second step is set to 'Rzq/2=150Ω'.

The second pull-up code PUC_2 for setting the pull-up driver 1211 to 'Rzq/2' is generated by the calibration of the pull-up driver 1211 in the second step. Further, a second pull-down code (PDC_2) for setting the resistance of the pull-down driver 1215 to 'Rzq/2' is generated by the calibration of the pull-down driver 1215 in the second step. The second pull-up code PUC_2 and the second pull-down code PDC_2 determined in the second step are stored in the pull-up code register 1232 and the pull-down code register 1234, respectively.

In step S150, it is checked whether the resistance value of the pull-up driver 1211 or the pull-down driver 1215 has reached the target resistance Rt by the steps of the recursive ZQ calibration operation performed in step S140. If the resistance value of the pull-up driver 1211 or the pull-down driver 1215 does not correspond to the target resistance value Rt input through the set feature command ('No' direction), the procedure moves to step S155. On the other hand, when the resistance value of the pull-up driver 1211 or the pull-down driver 1215 reaches the target resistance value Rt ('Yes' direction), the procedure moves to step S160.

In step S155, the steps of the recursive ZQ calibration operation are increased by the calibration control logic 1270, and the procedure returns to step S130. In step S130, the third step of the recursive ZQ calibration operation will start.

In step S160, the calibration control logic 1270 sets the pull-up code 1252 and pull-down code 1254 of the DQ driver 1250 to the determined target pull-up code (Target PU code) and target pull-down code (Target PD code).

In the above, the procedure of the recursive ZQ calibration operation of the present invention has been briefly described. In each step of the recursive ZQ calibration operation, calibration is performed using the parallel resistance value of the external resistance Rzq and the dummy pull-down driver 1220 as a reference resistance. As the steps of the recursive calibration operation are repeated, a pull-up code (PUC) and a pull-down code (PDC) matching the target resistance value are generated. Accordingly, the DQ driver 1250 can be set to a high-resolution target resistance value without binary calculation according to the recursive ZQ calibration operation according to the present invention. This means that the signal integrity of the data signal output from the DQ driver 1250 can be increased.

Figure 8:
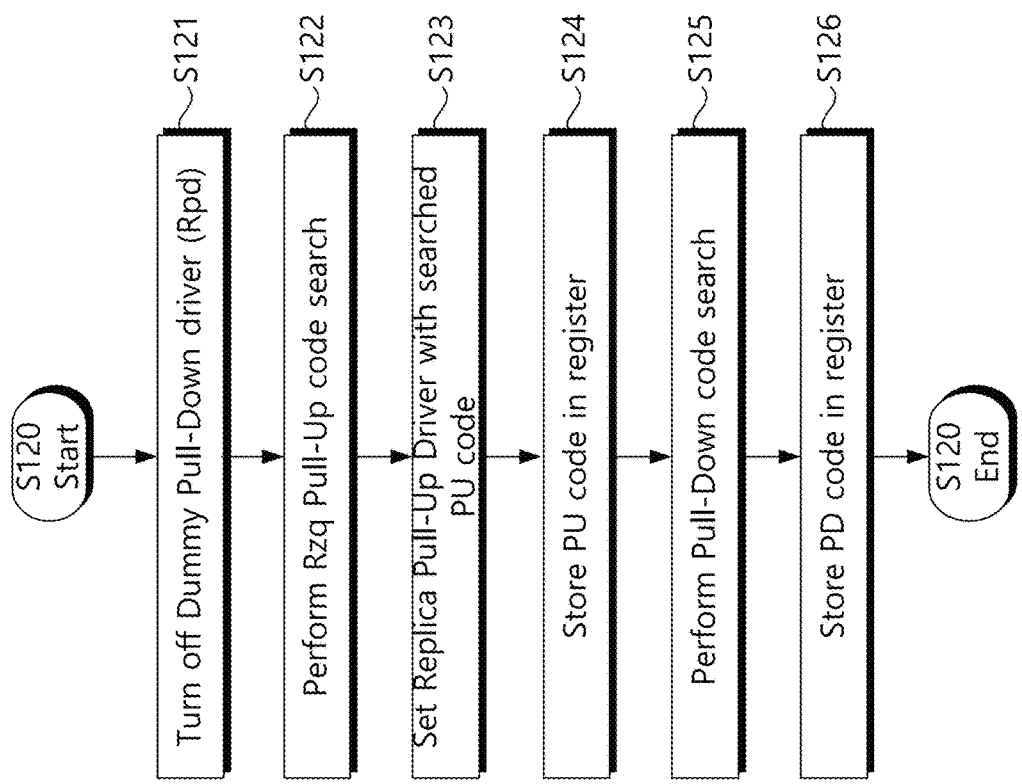
FIG. 8 is a flowchart showing step S120 of FIG. 7 in more detail according to example embodiments.

FIG. 8 is a flowchart showing step S120 of FIG. 7 in more detail according to example embodiments. Referring to FIG. 8, the first step of the recursive ZQ calibration operation will be described in detail.

In step S121, in the first step of the recursive calibration step, the dummy pull-down driver 1220 is turned off or deactivated. Then, the pull-up driver 1211 will be calibrated using only the external resistor Rzq as a reference resistor.

In step S122, calibration for generating a pull-up code (PUC) in the first step is performed. For example, pull-up driver calibration is performed to set the resistance value of the pull-up driver 1211 so that the voltage at the level of the reference voltage (VREF=VDDQ/2) is distributed to the external resistor Rzq connected to the ZQ pad. The first counter 1212 counts the code of the pull-up driver 1211 until the ZQ pad voltage Vzq across the external resistor Rzq reaches the reference voltage VREF=VDDQ/2. When the ZQ pad voltage (Vzq) reaches the reference voltage (VREF=VDDQ/2), the value of the first pull-up code (PUC_1) for making the resistance of the pull-up driver 1211 equal to the external resistance (Rzq) is determined.

In step S123, the replica pull-up driver 1214 is set to the value of the first pull-up code (PUC_1).

In step S124, the first pull-up code PUC_1 is transmitted to the pull-up code register 1232.

In step S125, pull-down calibration for generating a first pull-down code (PDC_1) is performed. The same pull-up resistor as that of the pull-up driver 1211 may be provided by the replica pull-up driver 1214 set to the first pull-up code PUC_1. The second counter 1217 counts up of down the code value of the pull-down driver 1215 until the voltage at the node (ZQ') between the replica pull-up driver 1214 and the pull-down driver 1215 reaches the reference voltage (VREF=VDDQ/2). When the voltage of the node ZQ' reaches the reference voltage (VREF=VDDQ/2), it means that the resistance value of the pull-down driver 1215 becomes equal to the external resistance Rzq.

In step S126, the first pull-down code PDC_1 is stored in the pull-down code register 1234. The first pull-down code PDC_1 stored in the pull-down code register 1234 will be used to set the dummy pull-down driver 1220 in the next step of the recursive ZQ calibration operation.

Figure 9:
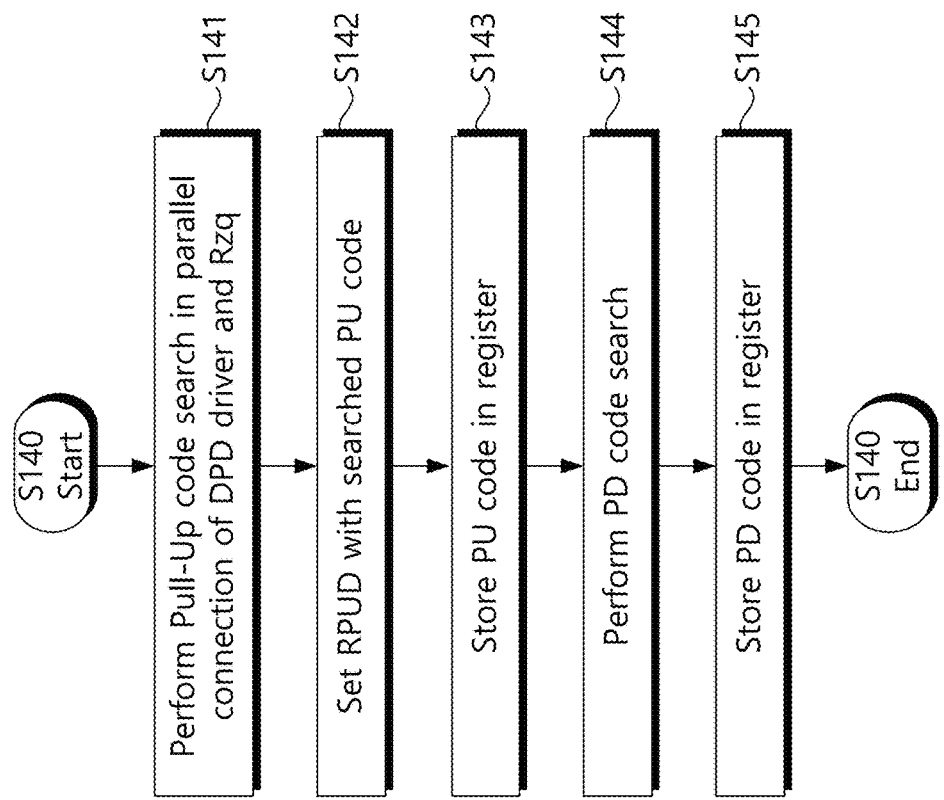
FIG. 9 is a flowchart showing step S140 of FIG. 7 in more detail according to example embodiments.

FIG. 9 is a flowchart showing step S140 of FIG. 7 in more detail according to example embodiments. Referring to FIG. 9, the recursive ZQ calibration operation in the second step or subsequent steps will be described.

In step S141, a second step or more steps are performed. First, calibration is performed after the pull-up driver 1211 is initialized. At this time, the pull-up driver 1211 is calibrated using the parallel resistance value of the external resistance Rzq and the set dummy resistance value Rpd of the dummy pull-down driver 1220 as a reference resistance. The pull-up driver 1211 is set to a resistance value corresponding to the reference resistance by the first comparator 1213 and the first counter 1212.

In step S142, the replica pull-up driver 1214 is set by the second pull-up code PUC_2 or higher pull-up code PCU_i set in the pull-up driver 1211.

In step S143, the second pull-up code PUC_2 or higher pull-up code PCU_i set in the pull-up driver 1211 is transmitted and stored in the pull-up code register 1232.

In step S144, the pull-down driver 1215 is calibrated based on the replica pull-up driver 1214 set by the second pull-up code PUC_2 or higher pull-up code PCU_i. Through calibration of the pull-down driver 1215, the second pull-down code PDC_2 or a higher pull-down code PDC_i is determined.

In step S145, the second pull-down code PDC_2 or higher pull-down codes PDC_i through the calibration of the pull-down driver 1215 are transmitted and stored in the pull-down code register 1234.

FIGS. 10A to 10D are diagrams exemplarily showing resistance values and signal flows of drivers in each step of a recursive ZQ calibration operation according to example embodiments. Referring to FIGS. 10A to 10D, each step operation of the recursive ZQ calibration operation of the present invention will be described in more detail. Here, it is assumed that the magnitude of the external resistance Rzq is '300Ω'.

Figure 10A:
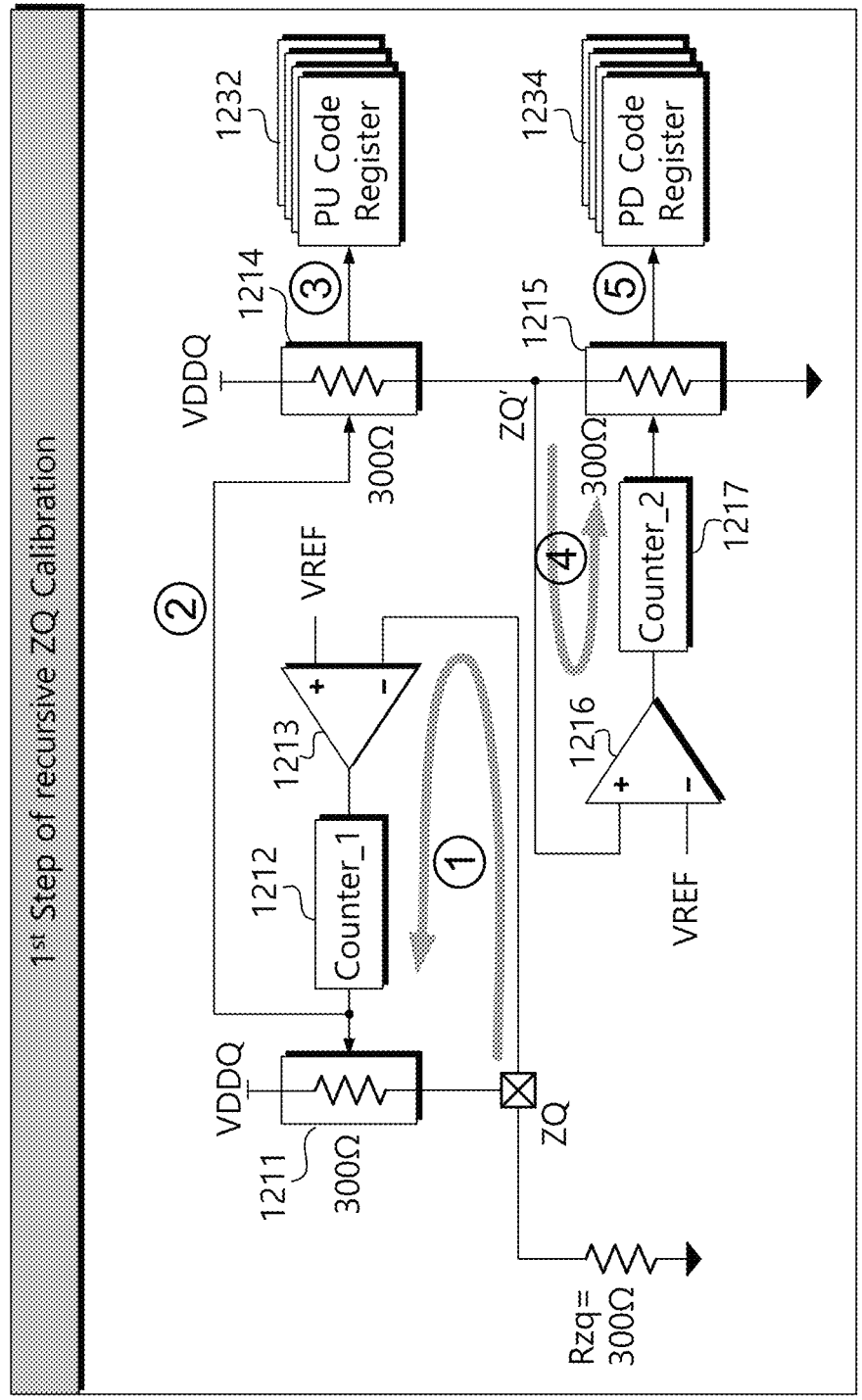
FIGS. 10A to 10D are diagrams exemplarily showing resistance values and signal flows of drivers in each step of a recursive ZQ calibration operation according to example embodiments.

Referring to FIG. 10A, states of circuits in a first step of a recursive ZQ calibration operation are illustratively shown. In the first step (1st Step), the dummy pull-down driver 1220 is disabled or opened. Therefore, only the external resistance (Rzq=300Ω) exists between the ZQ pad and the ground. For example, the calibration of the pull-up driver 1211 is performed based on the reference resistance value '300Ω'.

In a disabled state of the dummy pull-down driver 1220, ① pull-up calibration is performed. For pull-up calibration, the reference voltage VREF provided to the positive input terminal (+) of the first comparator 1213 may be 'VDDQ/2'. 'VDDQ/2' corresponds to the power supply voltage of the pull-up driver 1211 or half the value of the pull-up voltage (VDDQ). For example, the first counter 1212 counts up or down the code value of the pull-up driver 1211 until the voltage distributed to the external resistor Rzq reaches the reference voltage (VREF=VDDQ/2). When the voltage (Vzq) distributed to the ZQ pad reaches the reference voltage (VREF=VDDQ/2), the resistance of the pull-up driver 1211 will be '300Ω'. The pull-up code PUC at this time may be determined as the first pull-up code PUC_1 for setting the pull-up driver 1211 to '30022'.

The first pull-up code PUC_1 generated by the first counter 1212 is transferred to the replica pull-up driver 1214. This procedure is shown as ②. When the replica pull-up driver 1214 is set by the first pull-up code PUC_1, it has the same resistance value as '3002' as the pull-up driver 1211. The first pull-up code PUC_1 generated by the first counter 1212 is transmitted and stored in the pull-up code register 1232. This procedure is shown as ③.

Subsequently, pull-down calibration is performed to generate a first pull-down code PDC_1 corresponding to the first pull-up code PUC_1. This procedure is shown as ④. If pull-down calibration is performed based on the replica pull-up driver 1214 having a resistance value of '300Ω', a code value of the pull-down driver 1215 should ideally be generated to have a resistance value of '300Ω'.

To this end, the second counter 1217 counts up or counts down the code value of the pull-down driver 1215 until the voltage at the node (ZQ') between the replica pull-up driver 1214 and the pull-down driver 1215 reaches the reference voltage (VREF=VDDQ/2). When the voltage of the node ZQ' reaches the reference voltage (VREF=VDDQ/2), the resistance of the pull-down driver 1215 will converge to '300Ω'. The count value of the second counter 1217 at this time may be determined as the first pull-down code (PDC_1) for setting the pull-down driver 1215 to '300Ω'. The first pull-down code (PDC_1) is transferred to the pull-down code register 1234. This procedure is shown in ⑤. For example, the calibration control logic 1270 may generate a first flag signal when the first pull-down code (PDC_1) is transferred to the pull-down code register 1234 (i.e., procedure ⑤). In the above, operations in the first step of the recursive ZQ calibration have been described. In the first step of the recursive ZQ calibration, the dummy pull down driver 1220 is not used. For example, the first pull-up code PUC_1 and the first pull-down code PDC_1 are generated using only the external resistor Rzq.

Figure 10B:
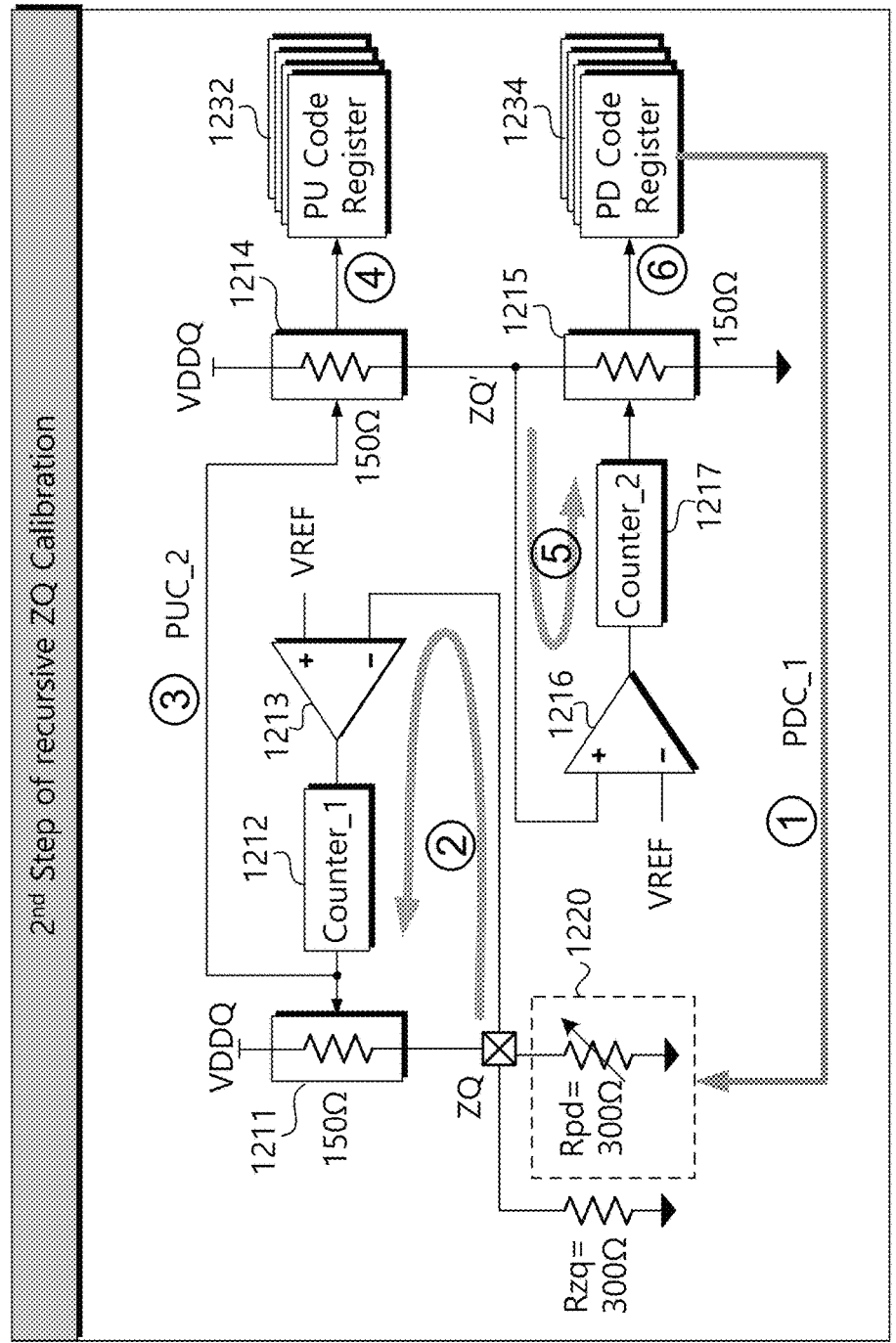

Referring to FIG. 10B, states of circuits in the second step of the recursive ZQ calibration operation are shown. Also in the second step, the calibration of the pull-up driver 1211 and the calibration of the pull-down driver 1215 are sequentially performed.

First, for calibration of the pull-up driver 1211, the dummy pull-down driver 1220 is set by the pull-down code PDC_1 generated as a result of the execution of the previous step. This procedure is shown as ①. The first pull-down code PDC_1 stored in the pull-down code register 1234 is input to the dummy pull-down driver 1220. For example, the procedure ① may be performed in response to the first flag signal from the calibration control logic 1270. Then, the dummy pull-down driver 1220 is set to a dummy resistance value of '300Ω' having the same magnitude as that of the pull-down driver 1215 determined in the first step. Then, the pull-down resistance value between the ZQ pad and the ground is set to a parallel resistance value (150Ω) of the external resistance Rzq and the dummy resistance value Rpd.

Then, pull-up calibration is performed. This procedure is shown in ②. For pull-up calibration, the pull-up driver 1211 is first initialized. Calibration of the pull-up driver 1211 is started using the parallel resistance value of the external resistance Rzq and the dummy resistance value Rpd as a reference resistance. When the calibration of the pull-up driver 1211 starts, voltage division occurs by the pull-up driver 1211 and the reference resistor (Rzq/2=150Ω), and the voltage (Vzq) distributed to the ZQ pad is input to the negative input terminal (−) of is the first comparator 1213. The reference voltage VREF supplied to the positive input terminal (+) of the first comparator 1213 is VDDQ/2. The first comparator 1213 and the first counter 1212 are operated by the pull-up driver 1211 until the voltage Vzq distributed between the power supply voltage VDDQ and the ZQ pad reaches the reference voltage VREF=VDDQ/2. When the ZQ pad voltage (Vzq) reaches the reference voltage (VREF=VDDQ/2), the resistance value of the pull-up driver 1211 will indicate 'Rzq/2', which is the same as the reference resistance value, for example, 150Ω. The count value determined by the first counter 1212 is transferred to the replica pull-up driver 1214 and the pull-up code register 1232 as the second pull-up code PUC_2 generated in the second step. These procedures are shown in ③ and ④.

Subsequently, calibration of the pull-down driver 1215 for generating the second pull-down code PDC_2 is performed. When set to the second pull-up code PUC_2, the replica pull-up driver 1214 is set to 'Rzq/2=150Ω', which is the same resistance (or impedance) as that of the pull-up driver 1211. That is, the pull-down driver 1215 is calibrated to have a resistance value of '150Ω' using the replica pull-up driver 1214 having a resistance value of '150Ω'. The second counter 1217 counts up or counts down the code value of the pull-down driver 1215 until the voltage at the node (ZQ') between the replica pull-up driver 1214 and the pull-down driver 1215 reaches the reference voltage (VREF=VDDQ/2). When the voltage of the node ZQ' reaches the reference voltage (VREF=VDDQ/2), the resistance value of the pull-down driver 1215 will be 'Rzq/2', for example, '150Ω'. This procedure is shown in ⑤. The count value determined by the second counter 1217 is transferred to the pull-down code register 1234 as a second pull-down code (PDC_2). This procedure is shown in ⑥. For example, the calibration control logic 1270 may generate a second flag signal when the second pull-down code (PDC_2) is transferred to the pull-down code register 1234 (i.e., procedure ⑥).

Figure 10C:
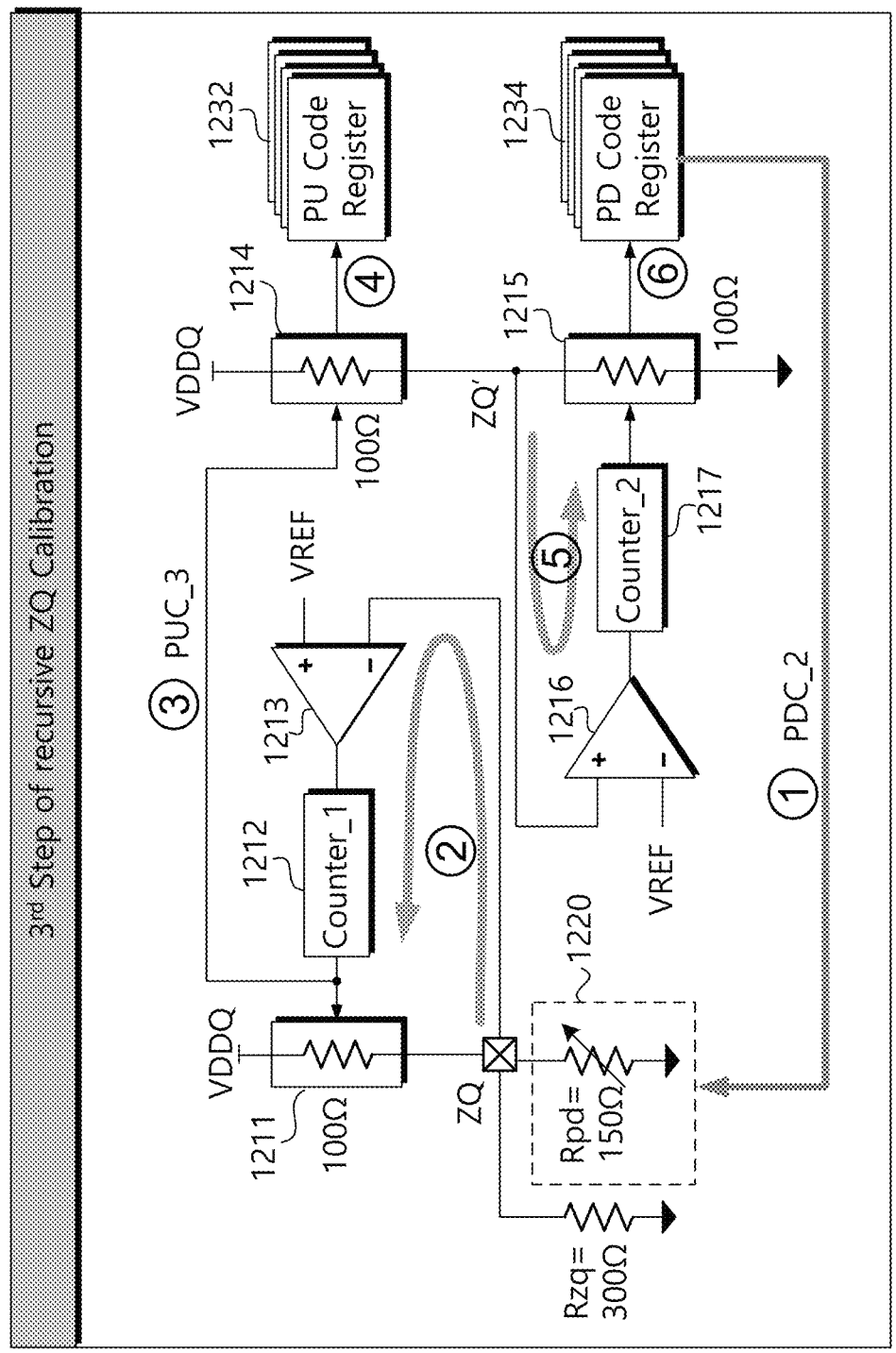

Referring to FIG. 10C, the state of the ZQ calibration circuit in the third step of the recursive ZQ calibration operation is shown. First, for calibration of the pull-up driver 1211, the dummy pull-down driver 1220 is set to the second pull-down code PDC_2 generated as a result of the execution of the second step. This procedure is shown as ①. The second pull-down code PDC_2 stored in the pull-down code register 1234 is input to the dummy pull-down driver 1220. For example, the procedure ①; may be performed in response to the second flag signal from the calibration control logic 1270. Then, the dummy pull-down driver 1220 is set to the dummy resistance value '150Ω'. As a result, the pull-down resistance value between the ZQ pad and the ground may be set to 'Rzq/3=100Ω', which is a parallel resistance value of the external resistance Rzq and the dummy resistance value Rpd.

Then, pull-up calibration is performed. This procedure is shown in ②. First, after the pull-up driver 1211 is initialized, calibration of the pull-up driver 1211 is started using the parallel resistance value of the external resistor Rzq and the dummy resistance value Rpd as a reference resistance. When the calibration of the pull-up driver 1211 starts, voltage division occurs by the pull-up driver 1211 and the reference resistance (Rzq/3=100Ω), and the voltage (Vzq) distributed to the ZQ pad is input to the negative input terminal (−) of the first comparator 1213. The reference voltage VREF supplied to the positive input terminal (+) of the first comparator 1213 is VDDQ/2. The first comparator 1213 and the first counter 1212 adjust the code of the pull-up driver 1211 until the voltage Vzq distributed to the ZQ pad by the power supply voltage VDDQ reaches the reference voltage VREF=VDDQ/2. When the ZQ pad voltage (Vzq) reaches the reference voltage (VREF=VDDQ/2), the resistance of the pull-up driver 1211 will be set to 'Rzq/3', the same as the reference resistance, for example, 100Ω. The count value determined by the first counter 1212 is transferred to the replica pull-up driver 1214 and the pull-up code register 1232 as a third pull-up code PUC_3 generated in the third step. These procedures are shown in ③ and ④.

Subsequently, calibration of the pull-down driver 1215 for generating the third pull-down code PDC_3 is performed. When set to the third pull-up code PUC_3, the replica pull-up driver 1214 is set to 'Rzq/3=100Ω', which is the same resistance (or impedance) as the pull-up driver 1211. That is, the pull-down driver 1215 is calibrated to have a resistance value of '100Ω' using the replica pull-up driver 1214 having a resistance value of '100Ω'. The second counter 1217 will adjust the pull-down driver 1215 until the voltage at the node (ZQ') between the replica pull-up driver 1214 and the pull-down driver 1215 reaches the reference voltage (VREF=VDDQ/2). When the voltage of the node ZQ' reaches the reference voltage (VREF=VDDQ/2), the resistance of the pull-down driver 1215 becomes 'Rzq/3', for example, '100Ω'. This procedure is shown in ⑤. The count value determined by the second counter 1217 is transmitted to the pull-down code register 1234 as a third pull-down code (PDC_3). This procedure is shown in ⑥. For example, the calibration control logic 1270 may generate a third flag signal when the third pull-down code (PDC_3) is transferred to the pull-down code register 1234 (i.e., procedure ⑥)

Figure 10D:
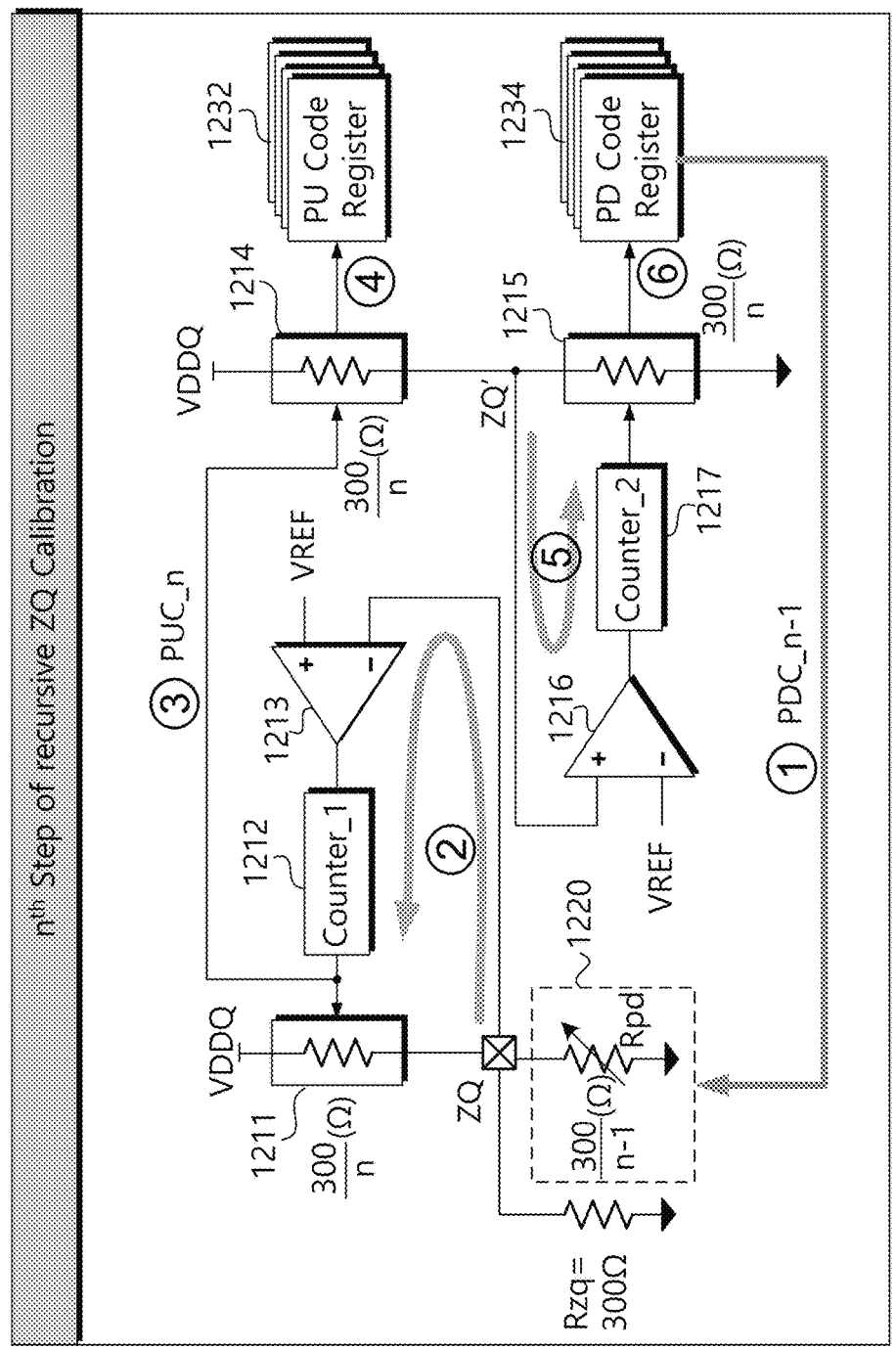

Referring to FIG. 10D, states of the circuits at the nth step of the recursive ZQ calibration operation are shown. First, for calibration of the pull-up driver 1211, the dummy pull-down driver 1220 is set to the pull-down code (PDC_n−1) generated as a result of the execution of the previous step (step n−1). This procedure is shown as ①. The pull-down code (PDC_n−1) stored in the pull-down code register 1234 is input to the dummy pull-down driver 1220. For example, the procedure (1; may be performed in response to the third flag signal from the calibration control logic 1270. Then, the dummy pull-down driver 1220 is set to the dummy resistance value '300/(n−1)Ω'. As a result, the pull-down resistance value between the ZQ pad and the ground may be set to '300/n'Ω, which is a parallel resistance value of the external resistance Rzq and the dummy resistance value Rpd.

Then, pull-up calibration is performed. This procedure is shown in ②. First, after the pull-up driver 1211 is initialized, calibration of the pull-up driver 1211 is started using the parallel resistance value (300/nΩ) of the external resistance Rzq and the dummy resistance value Rpd as a reference resistance. When the calibration of the pull-up driver 1211 starts, voltage division occurs by the pull-up driver 1211 and the reference resistance (Rzq/nΩ), and the voltage (Vzq) distributed to the ZQ pad is input to the input negative terminal (−) of the first comparator 1213. The reference voltage VREF supplied to the positive input terminal (+) of the first comparator 1213 is VDDQ/2. The first comparator 1213 and the first counter 1212 adjust the code of the pull-up driver 1211 until the voltage Vzq distributed to the ZQ pad by the power supply voltage VDDQ reaches the reference voltage VREF=VDDQ/2. When the ZQ pad voltage (Vzq) reaches the reference voltage (VREF=VDDQ/2), the resistance value of the pull-up driver 1211 will be set to '300/n'Ω, which is the same as the reference resistance value. The count value determined by the first counter 1212 is transferred to the replica pull-up driver 1214 and the pull-up code register 1232 as the nth pull-up code PUC_n generated in the nth step. These procedures are shown in ③ and ④.

Subsequently, calibration of the pull-down driver 1215 for generating the nth pull-down code PDC_n is performed. When set to the nth pull-up code PUC_n, the replica pull-up driver 1214 is set to '300/n'Ω, which is the same resistance (or impedance) as that of the pull-up driver 1211. That is, by using the replica pull-up driver 1214 having a resistance value of '300/n'Ω, the pull-down driver 1215 is also calibrated to have a resistance value of '300/n'Ω. The second counter 1217 will adjust the pull-down driver 1215 until the voltage at the node (ZQ') between the replica pull-up driver 1214 and the pull-down driver 1215 reaches the reference voltage (VREF=VDDQ/2). When the node (ZQ') voltage reaches the reference voltage (VREF=VDDQ/2), the resistance of the pull-down driver 1215 will be '300/nΩ'. This procedure is shown in ⑤. The count value determined by the second counter 1217 is transferred to the pull-down code register 1234 as the nth pull-down code PDC_n. This procedure is shown in ⑥. For example, the calibration control logic 1270 may generate an nth flag signal when the nth pull-down code (PDC_n) is transferred to the pull-down code register 1234 (i.e., procedure ⑥).

In the above, a procedure for performing a recursive ZQ calibration operation using an external resistor (Rzq) of '300Ω' has been described through the ZQ calibration circuit 1201. Through the recursive ZQ calibration operation of the present invention, generation of a pull-up code (PUC) or a pull-down code (PDC) for setting a target resistance value can be achieved without a binary operation.

Figure 11:
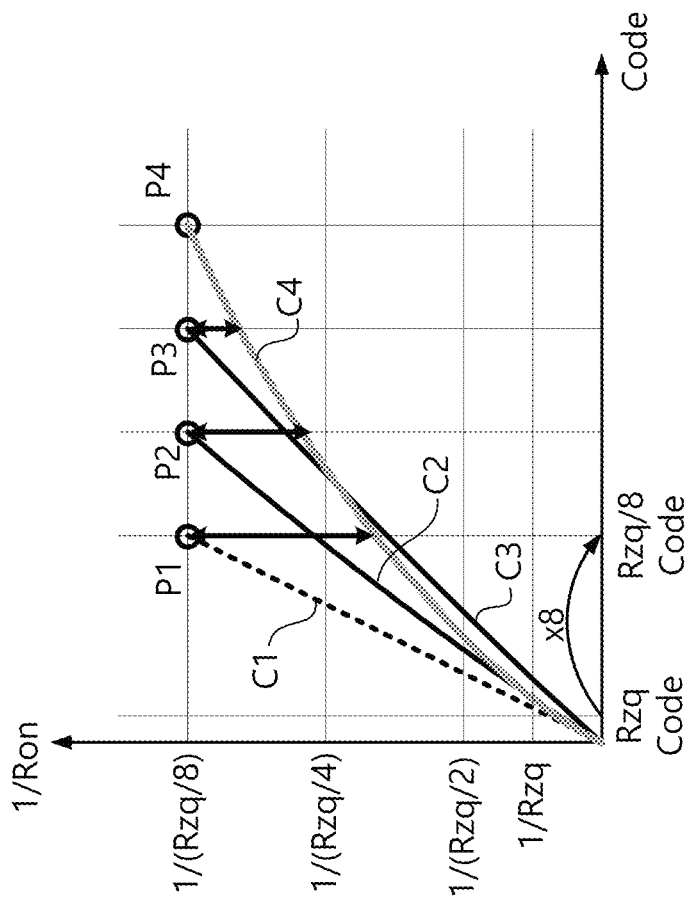
FIG. 11 is a graph briefly showing the effect of the recursive ZQ calibration operation according to example embodiments.

FIG. 11 is a graph briefly showing the effect of the recursive ZQ calibration operation according to example embodiments. Referring to FIG. 11, when a target resistance value (Rzq/8) is implemented through binary operation using reference resistance values (Rzq, Rzq/2, Rzq/4, Rzq/8), the size of the mismatch with the resistance value of the actual driver is shown. The horizontal axis represents a code value implemented through calibration. The vertical axis represents the reciprocal of the used reference resistance values (Rzq, Rzq/2, Rzq/4, Rzq/8). A curve C4 represents the characteristics of an actual driver generated by a process change or temperature of each of the reference resistance values Rzq, Rzq/2, Rzq/4, and Rzq/8.

If one calibration is performed using 'Rzq' as a reference resistance, a calibration code (Rzq Code) will be generated. If a binary operation (×8) is performed to set this to 'Rzq/8', which is the target resistance value, a binary code (Rzq/8 Code) is generated. The binary operation characteristic of the calibration code (Rzq Code) generated using the reference resistor 'Rzq' is shown as a curve (C1). The resistance value or current value corresponding to the binary code (Rzq/8 Code) when 'Rzq' is used as the reference resistance corresponds to the 'P1' point. It can be seen that this indicates a relatively large mismatch with the curve C4 representing the actual resistance or current value.

If calibration is performed using 'Rzq/2' as the reference resistance, a calibration code (Rzq/2 Code) will be generated. If a binary operation (×4) is performed to set this to the target resistance value 'Rzq/8', a binary code (Rzq/8 Code) is generated. The binary operation characteristic of the calibration code (Rzq Code) generated using the reference resistor 'Rzq/2' is shown as a curve (C2). The resistance value or current value corresponding to the binary code (Rzq/8 Code) when 'Rzq/2' is used as the reference resistance corresponds to the 'P2' point. This shows a mismatch size that decreases relative to the curve C4 representing the actual resistance or current value.

If calibration is performed using 'Rzq/4' as the reference resistance, a calibration code (Rzq/4 Code) will be generated. If a binary operation (×2) is performed to set this to the target resistance value 'Rzq/8', a binary code (Rzq/8 Code) is generated. The binary operation characteristic of the calibration code (Rzq Code) generated using the reference resistor 'Rzq/4' is shown as a curve (C3). The resistance value or current value corresponding to the binary code (Rzq/8 Code) when 'Rzq/4' is used as the reference resistance corresponds to the 'P3' point. This shows a mismatch size that further decreases relative to the curve C4 representing the actual resistance or current value.

As described above, if the recursive ZQ calibration operation of the present invention is used, mismatch with the actual resistance value generated by binary operation can be reduced. As shown in the above figure, in order to generate a calibration code that almost matches the target resistance value (Rzq/8), it is possible to generate a target code without mismatch by applying 8 times of recursive ZQ calibration according to the present invention.

The above are specific embodiments for carrying out the present invention. In addition to the above-described embodiments, the present invention may include simple design changes or easily changeable embodiments. In addition, the present invention will include techniques that can be easily modified and implemented using the embodiments. While the present disclosure has been described with reference to exemplary embodiments thereof, it will be apparent to those of ordinary skill in the art that various changes and modifications may be made thereto without departing from the spirit and scope of the invention as set forth in the following claims.

What is claimed is:

1. A semiconductor memory device, comprising:
    an impedance adjustment pad;
    a dummy pull-down driver and an external resistor connected in parallel between the impedance adjustment pad and a ground;
    a recursive code generation circuit configured to recursively generate a pull-up code and a pull-down code corresponding to a target resistance by using the external resistor and the dummy pull-down driver as a reference resistance, in an impedance calibration operation of the semiconductor memory device;
    a code register configured to store the generated pull-up code and the pull-down code; and
    a calibration control logic circuit configured to control the recursive code generation circuit during a plurality of steps in the impedance calibration operation while adjusting a resistance value of the dummy pull-down driver.

2. The semiconductor memory device of claim 1, wherein the dummy pull-down driver includes a plurality of transistors having different aspect ratios connected in parallel between the impedance adjustment pad and the ground.

3. The semiconductor memory device of claim 1, wherein, the recursive code generation circuit is configured to deactivate the dummy pull-down driver in a first step among the plurality of steps.

4. The semiconductor memory device of claim 3, wherein, in a current step among the plurality of steps, the dummy pull-down driver is configured to set a resistance value in response to a pull-down code generated in a previous step among the plurality of steps.

5. The semiconductor memory device of claim 4, wherein a resistance value of the reference resistance corresponds to a value obtained by dividing a resistance value of the external resistor by the number of steps.

6. The semiconductor memory device of claim 1, wherein the recursive code generation circuit comprises:
    a first comparator configured to compare a voltage distributed to the impedance adjustment pad with a reference voltage;
    a first counter configured to count up or count down according to the comparison of the first comparator;
    a pull-up driver connected between the impedance adjustment pad and a power supply voltage and configured to set a resistance value in response to a count value of the first counter as a pull-up code;
    a replica pull-up driver configured to set a resistance value in response to the pull-up code determined by the first counter;
    a pull-down driver connected between the replica pull-up driver and the ground;
    a second comparator configured to compare a voltage on a node connected to the replica pull-up driver and the pull-down driver with the reference voltage; and
    a second counter configured to set the pull-down driver to a pull-down code that counts up or counts down according to the comparison of the second comparator.

7. The semiconductor memory device of claim 6, wherein the reference voltage is half of the power supply voltage.

8. The semiconductor memory device of claim 7, wherein the pull-up code determined by the first counter and the pull-down code determined by the second counter are stored in the code register at every step.

9. The semiconductor memory device of claim 1, wherein the target resistance is provided through a set feature command provided from an outside of the semiconductor memory device.

10. The semiconductor memory device of claim 1, wherein the code register comprises:
    a pull-up code register configured to store the pull-up code generated as a result of executing each of the plurality of steps; and
    a pull-down code register configured to store the pull-down code generated as a result of executing each of the plurality of steps.

11. An impedance calibration method of a semiconductor memory device, the impedance calibration method comprising:
    receiving a target resistance and a calibration command;
    generating a first pull-up code and a first pull-down code by calibrating a pull-up driver and a pull-down driver using an external resistance connected to an impedance adjustment pad as a reference resistance;
    setting a dummy pull-down driver connected in parallel to the external resistance between the impedance adjustment pad and a ground to the first pull-down code; and
    generating a second pull-up code and a second pull-down code by calibrating the pull-up driver and the pull-down driver using a parallel resistance value of the external resistance and the dummy pull-down driver as the reference resistance.

12. The impedance calibration method of claim 11, wherein the generating of the first pull-up code and the first pull-down code includes deactivating the dummy pull-down driver.

13. The impedance calibration method of claim 11, further comprising:
    setting the dummy pull-down driver to an n−1th pull-down code; and
    generating an nth pull-up code and an nth pull-down code by calibrating the pull-up driver and the pull-down driver using a parallel resistance value of the external resistance and the dummy pull-down driver as the reference resistance, wherein n is an integer greater than or equal to 3.

14. The impedance calibration method of claim 13, wherein the parallel resistance value of the external resistance and the dummy pull-down driver corresponds to a value obtained by dividing a value of the external resistance by the n corresponding to the number of recursive calibration steps.

15. The impedance calibration method of claim 13, further comprising:
    setting a data driver connected to a data pad of the semiconductor memory device using the nth pull-up code and the nth pull-down code corresponding to the target resistance.

16. The impedance calibration method of claim 11, wherein the target resistance is provided to the semiconductor memory device through a set feature command.

17. A semiconductor memory device, comprising:

an impedance adjustment pad;

an external resistance and an on-chip dummy pull-down driver connected in parallel between the impedance adjustment pad and a ground; and an impedance calibration circuit configured to:

generate a pull-up code and a pull-down code corresponding to a target resistance using the external resistance and the on-chip dummy pull-down driver as a reference resistance, set the on-chip dummy pull-down driver to a pull-down code of a previous step among a plurality of steps until a pull-up code and a pull-down code corresponding to the target resistance is generated, and perform a recursive impedance calibration operation in a current step using a parallel resistance value of the external resistance and the on-chip dummy pull-down driver determined in the previous step as the reference resistance.

18. The semiconductor memory device of claim 17, wherein the impedance calibration circuit is configured to deactivate the on-chip dummy pull-down driver in a first step among the plurality of steps.

19. The semiconductor memory device of claim 17, wherein the impedance calibration circuit includes a code register configured to store a pull-up code and a pull-down code determined in each of the plurality of steps of the recursive impedance calibration operation.

20. The semiconductor memory device of claim 19, wherein, in a current step among the plurality of steps, the impedance calibration circuit is configured to set the on-chip dummy pull-down driver to the pull-down code stored in the code register in a previous step.

* * * * *